United States Patent [19]

Nagano et al.

[11] Patent Number: 5,651,087
[45] Date of Patent: Jul. 22, 1997

[54] DECODER FOR DECODING STILL PICTURES DATA AND DATA ON WHICH DATA LENGTH OF STILL PICTURE DATA IS RECORDED REPRODUCING APPARATUS FOR REPRODUCING RECORDING MEDIUM AND REPRODUCING METHOD THEREOF

[75] Inventors: Shuichi Nagano; Kenji Tomizawa, both of Kanagawa, Japan

[73] Assignee: Sony Corporation, Tokyo, Japan

[21] Appl. No.: 534,862

[22] Filed: Sep. 27, 1995

[30] Foreign Application Priority Data

Oct. 4, 1994 [JP] Japan ................. 6-263295

[51] Int. Cl.$^6$ ............... H04N 5/94; H04N 5/781
[52] U.S. Cl. ............... 386/51; 386/70; 386/111; 386/112; 386/126
[58] Field of Search ................. 386/8, 33, 68, 386/95, 109, 111, 112, 113, 121, 123, 124, 2, 47, 49, 51; 360/20, 18, 25, 27, 53, 8, 69; 348/616, 617; 369/47; H04N 9/79, 9/88, 5/94, 5/91, 5/92, 5/911, 7/64, 5/78

[56] References Cited

U.S. PATENT DOCUMENTS 5,170,264 12/1992 Saito et al. .
5,177,619 1/1993 Sato .

FOREIGN PATENT DOCUMENTS

| 0559426A2 | 9/1993 | European Pat. Off. . |
|---|---|---|
| 2165417 | 9/1985 | United Kingdom . |
| 2206260 | 5/1988 | United Kingdom . |
| 2212025 | 10/1988 | United Kingdom . |
| 2244884 | 5/1990 | United Kingdom . |
| 8704033 | 12/1986 | WIPO . |
| 9106181 | 10/1990 | WIPO . |

OTHER PUBLICATIONS

Video-Rate Image Correlation Process J.J. Pearson et al., SPIE, vol. 119, Application of Digital Image Processing, (IOCC 1977) (month not available).

Motion-Compensated Television Coding: Part I, A.N. Netravali et al., BSTJ, vol. 58, No. 3, Mar. 1979.

Motion Estimation and Its Application to HDTV Transmission and Up-Conversion Using DATV, G.A. Thomas, SMPTE Journal, Dec. 1990.

*Primary Examiner*—Thai Tran
*Attorney, Agent, or Firm*—William S. Frommer; Alvin Sinderbrand

[57] ABSTRACT

In a picture data reproducing apparatus, a data dropout from a disc such as a CD-DA can be avoided. In a still picture data reproducing apparatus for reproducing a recording medium on which both of still picture data having at least variable data length, and data length information corresponding to the still picture data have been recorded, this reproducing apparatus is characterized by including: a reader for reading out both of the still picture data and the data length information corresponding to the still picture data from the recording medium; a decoder for decoding the still picture data and also the data length information corresponding to the still picture data, which are read out by the reader; a counter for counting a data length of the still picture data decoded by the decoder; a comparator for comparing the data length information decoded by the decoder with the data length counted by the counter; and a controller for making such a judgement that the data is dropped out by way of the comparator when the data length information decoded by the decoder is not coincident with the data length of the still picture data counted by the counter, and for controlling the reader to again read out the same still image data.

13 Claims, 24 Drawing Sheets

FIG. 1

| PHYSICAL FORMAT | CD-ROM(XA) |
|---|---|
| DIGITAL VIDEO | DEPENDING TO MPEG1<br><br>PIXEL SIZE (PIXEL NUMBER)/FRAME FREQUENCY :<br><br>    352×240/29.97Hz(NTSC)<br><br>    352×240/23.976Hz(FILM)<br><br>    352×288/25Hz(PAL)<br><br>DATA TRANSFER SPEED :<br><br>  MAX. 1.152 Mbits/sec |
| DIGITAL AUDIO | MPEG1 LAYER2<br><br>SAMPLING FREQUENCY :<br><br>DATA TRANSFER SPEED : 224 Kbits/sec (AFTER TRACK2)<br>64,96,128,192,224,384 Kbits/sec (TRACK1) |
| REPRODUCING TIME | MAX. 74 minu. |
| PIXEL NUMBER OF STILL PICTURE | STANDARD LEVEL : 352×240(NTSC)<br>                   352×288(PAL)<br>HIGH DEFINITION LEVEL : 704×480(NTSC)<br>                         704×576(PAL) |
| REPRODUCING MODE | NORMAL REPRODUCTION, SLOW, PAUSE etc.<br><br>MENU REPRODUCTION BY USING PLAYBACK CONTROL |
| VIDEO SIGNAL OUTPUT | NTSC/PAL |
| APPLICATION FIELD | MOVIE, KARAOKE, MUSIC, EDUCATION, PHOTOGRAPH, ALBUM etc. |

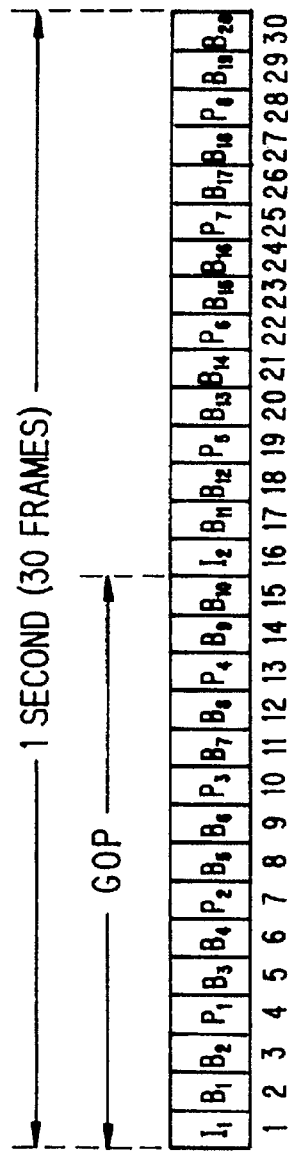
FIG. 3A
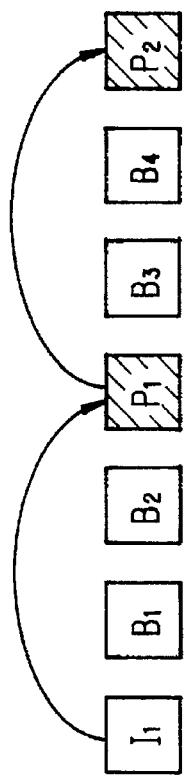
FIG. 3B
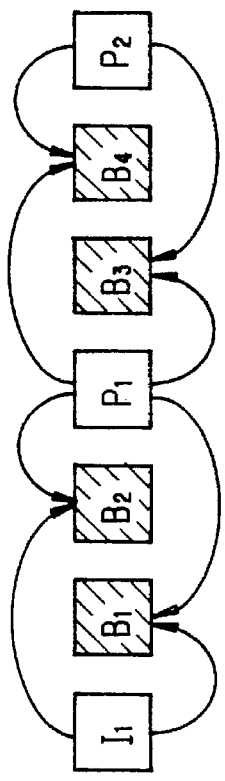
FIG. 3C
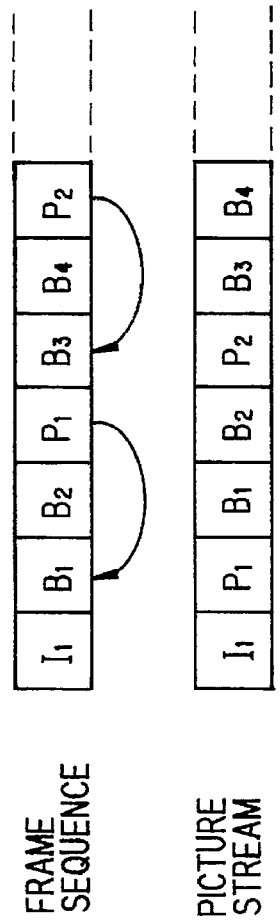
FIG. 3D
FIG. 3C

BASIC STRUCTURE OF SECTOR

EXAMPLE OF VIDEO SECTOR

EXAMPLE OF AUDIO SECTOR

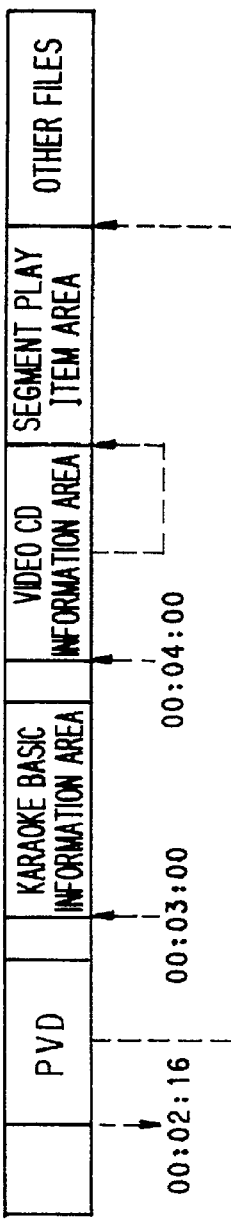

FIG. 7
FRAME STRUCTURE
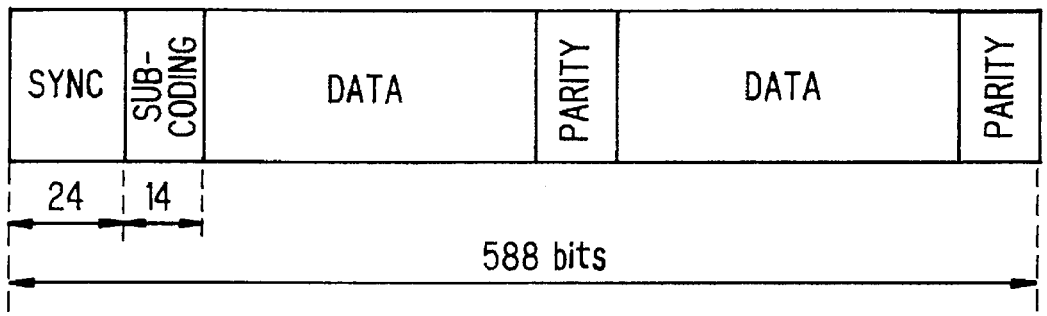
FIG. 8A
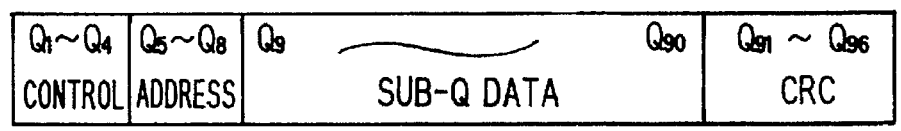
FIG. 8B
| $Q_1$~$Q_4$ | $Q_5$~$Q_8$ | $Q_9$ | SUB-Q DATA | $Q_{90}$ | $Q_{91}$ ~ $Q_{96}$ |
|---|---|---|---|---|---|
| CONTROL | ADDRESS | | | | CRC |

FIG. 10

TOC STRUCTURE ( EXAMPLE OF DISK CONTAINING OF 6 TRACKS )

| TNO | BLOCK | POINT | PMIN, PSEC, PFRAME | |
|---|---|---|---|---|
| 00 | | 01 | 00.02.32 | START POINT OF TRACK #1 |
| | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | | |
| | n+10 | 04 | ǀ ǀ | |
| | n+11 | 04 | ǀ ǀ | |
| | n+12 | 05 | ǀ ǀ | |
| | n+13 | 05 | ǀ ǀ | |
| | n+14 | 05 | | |
| | n+15 | 06 | 19.10.03 | START POINT OF TRACK #6 |
| | n+16 | 06 | 19.10.03 | |
| | n+17 | 06 | 19.10.03 | |
| | n+18 | A0 | 01.20.00 | TRACK NUMBER OF FIRST TRACK IN DISK |
| | n+19 | A0 | 01.20.00 | |
| | n+20 | A0 | 01.20.00 | |
| | n+21 | A1 | 06.00.00 | TRACK NUMBER OF FIRST TRACK IN DISK |
| | n+22 | A1 | 06.00.00 | |
| | n+23 | A1 | 06.00.00 | |
| | n+24 | A2 | 52.48.41 | START POINT OF READOUT TRACK |
| | n+25 | A2 | 52.48.41 | |
| 00 | n+26 | A2 | 52.48.41 | |
| 00 | n+27 | 01 | 00.02.32 | REPEAT |
| | n+28 | 01 | 00.02.32 | |
| | ǀ | ǀ | ǀ ǀ | |
| | ǀ | ǀ | ǀ ǀ | |

DIRECTORY STRUCTURE OF VIDEO CD (Ver2.0)

FIG. 12

STRCTURE OF PVD ( PRINCIPLE VOLUME DESCRIPTOR )

| BYTE POSITION | BYTE SIZE | CONTENT |
|---|---|---|
| 2 | 5 | VOLUME STRUCTURE STANDARD ID |
| 9 | 32 | SYSTEM IDENTIFIER |
| 41 | 32 | VOLUME IDENTIFIER |
| 123 | 2 | VOLUME NUMBER IN ALBUM |
| 127 | 2 | ALBUM SET SEQUENCE NUMBER |
| 131 | 2 | LOGIC BLOCK SIZE |
| 137 | 4 | BUS TABLE |
| 141 | 8 | ADDRESS OF BUS TABLE |
| 157 | 34 | ROUTE DIRECTORY RECORD |
| 191 | 128 | ALBUM IDENTIFIER |
| 319 | 128 | ISSUER IDENTIFIER |
| 447 | 128 | WRITER NAME IDENTIFIER |
| 575 | 128 | APPLICATION IDENTIFIER |
| 703 | 32 | COPY WRITE NAME |
| 740 | 32 | ABSTRACT FILE NAME |
| 777 | 32 | LIST FILE NAME |
| 814 | 16 | FORMING DAY/TIME |
| 831 | 16 | CORRECTING DAY/TIME |
| 848 | 16 | EXPIRATION DAY/TIME |
| 865 | 16 | EFFECTIVE DAY/TIME |
| 882 | 1 | STANDARD VERSION NUMBER OF FILE STRUCTURE |
| 1025 | 26 | XA LABLE RECORD |

FIG. 14

DISK INFORMATION STRUCTURE IN VIDEO CD INFORMATION AREA

| BYTE POSITION | BYTE SIZE | CONTENT |
|---|---|---|
| 1~8 | 8 | SYSTEM IDENTIFIER |
| 9~10 | 2 | VERSION NUMBER |
| 11~26 | 16 | ALBUM IDENTIFIER |
| 27~28 | 2 | VOLUME NUMBER IN ALBUM |
| 29~30 | 2 | ALBUM SET SEQUENCE NUMBER |
| 31~43 | 13 | SIZE MAP OF MOVING PICTURE TRACK |
| 44 | 1 | STATUS FLAG |
| 45~48 | 4 | PSD SIZE |
| 49~51 | 3 | FIRST SEGMENT ADDRESS |
| 52 | 1 | OFFSET MULTIPLIER |
| 53~54 | 2 | NUMBER OF LIST ID |
| 55~56 | 2 | NUMBER OF SEGMENT ITEM |
| 57~2036 | 1980 | SEGMENT PLAY ITEM CONTENT TABLE |
| 2037~2048 | 12 | RESERVE |

SEGMENT PLAY ITEM CONTENT TABLE

FIG. 16

LIST ID OFFSET TABLE
( LIST ID NUMBER = n )

SECTOR ADDRESS

| | | | |
|---|---|---|---|
| 0 0 : 0 4 : 0 2 | START-UP OFFSET | $ 0 0 0 0 | 2 bytes |
| | LIST ID1 OFFSET | $ 0 0 0 0 | 2 bytes |
| | LIST ID2 OFFSET | $ x x x x | 2 bytes |
| 32 SECTORS | ⋮ | ⋮ | |
| | LIST IDn OFFSET | $ x x x x | 2 bytes |
| | UNUSED LIST ID | $ F F F F | 2 bytes |
| | ⋮ | ⋮ | |
| 0 0 : 0 4 : 3 3 | UNUSED LIST ID | $ F F F F | 2 bytes |

FIG. 17

PLAY LIST

| PLAY LIST HEADER | 1 byte |
|---|---|
| NUMBER OF ITEM | 1 byte |
| LIST ID NUMBER | 2 bytes |
| PREVIOUS LST OFFSET | 2 bytes |
| NEXT LIST OFFSET | 2 bytes |
| RETURN LIST OFFSET | 2 bytes |
| PLAYING TIME | 2 bytes |
| PLAYING WAIT TIME | 1 byte |
| AUTO-PAUSE WAIT TIME | 1 byte |
| PLAY ITEM #1 NUMBER (PIN#1) | 2 bytes |
| ⋮ | ⋮ |
| PLAY ITEM #N NUMBER (PIN#N) | 2 bytes |

FIG. 18

DEFINITION ON PLAY ITEM NUMBER

| PLAY ITEM NUMBER (PIN) | IMPLICATION |
|---|---|
| PIN = 0 or 1 | NO REPRODUCTION |
| PIN = 2 ~ 99 | REPRODUCE TRACKS DESIGNATED BY PIN AMONG TRACKS #2 TO #99 |
| PIN = 100 ~ 599 | REPRODUCE ENTRY POINTS DESIGNATED BY (PIN-100) IN ENTRY TABLE |
| PIN = 600 ~ 999 | NO DEFINITION |
| PIN = 1000 ~ 2979 | REPRODUCE SEGMENT PLAY ITEMS DESIGNATED BY (PIN-999) AMONG SEGMENT PLAY ITEMS #1 TO #1980 |
| PIN = 2980 ~ $FFFF | NO DEFINITION |

FIG. 19

SELECTION LIST

| | |
|---|---|
| SELECTION LIST HEADER | 1 byte |
| UNUSED | 1 byte |
| NUMBER OF SELECTION TREE (NOS) | 1 byte |
| FIRST NUMBER (BSN) OF SELECTION TREE | 1 byte |
| LIST ID NUMBER | 2 bytes |
| PREVIOUS LIST OFFSET | 2 bytes |
| NEXT LIST OFFSET | 2 bytes |
| RETURN LIST OFFSET | 2 bytes |
| DEFAULT LIST OFFSET | 2 bytes |
| TIME OUT LIST OFFSET | 2 bytes |
| WAIT TIME UNTIL TIME OUT | 1 byte |
| LOOP COUNT AND JUMP TIMING | 1 byte |
| PLAY ITEM NUMBER (PIN) | 2 bytes |
| SELECTION #BSN OFFSET | 2 bytes |
| ⋮ | ⋮ |
| SELECTION #(BSN+NOS-1) OFFSET | 2 bytes |

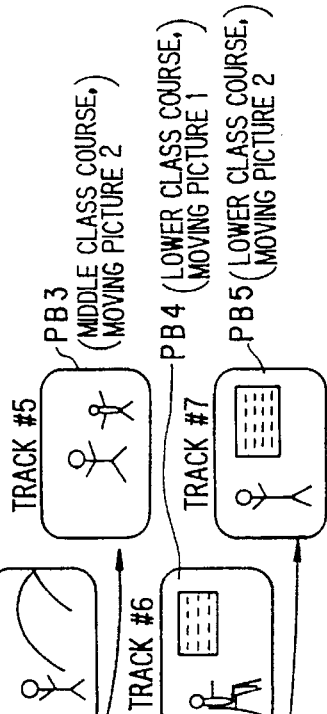
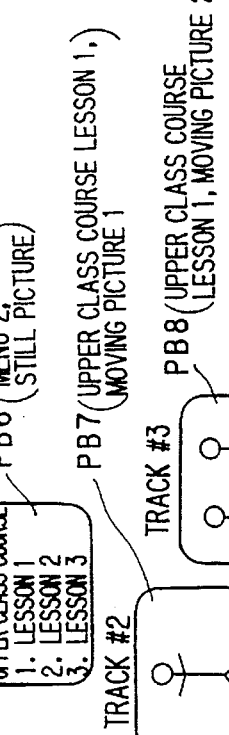
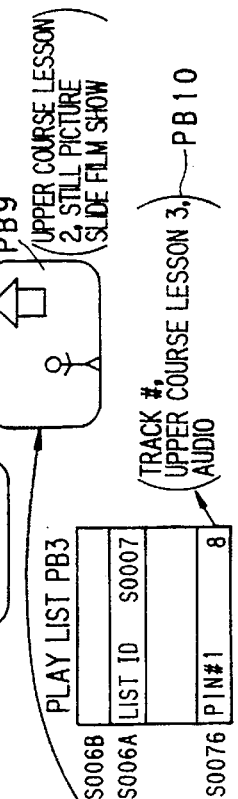
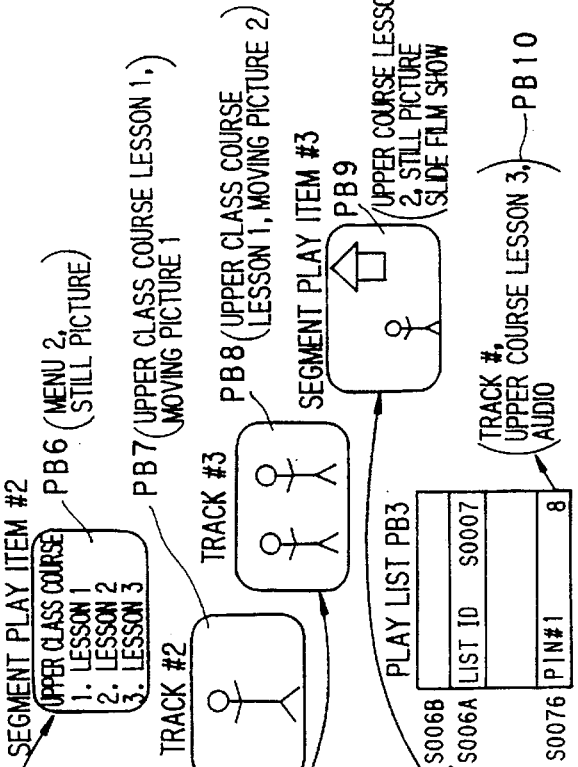
FIG. 21

DECODER FOR DECODING STILL PICTURES DATA AND DATA ON WHICH DATA LENGTH OF STILL PICTURE DATA IS RECORDED REPRODUCING APPARATUS FOR REPRODUCING RECORDING MEDIUM AND REPRODUCING METHOD THEREOF

BACKGROUND OF THE INVENTION

1. Field of the Invention

The present invention relates to a reproducing apparatus capable of reproducing a disc on which still picture (static image) data has been recorded.

2. Description of the Related Art

Various disc media such as audio compact discs, i.e., a so-called "read-only disc" have been popularized. As to audio compact discs, digital audio data are recorded on the discs to reproduce music and the like with high sound qualities. As one sort of such an audio compact disc (CD-DA), a CD-Graphics (CD-G) in which still image data has been recorded within subcode data is known.

Furthermore, such a video CD that not only digital audio data, but also moving picture data as well as still picture data have been recorded has been developed as one sort of a so-termed "CD-ROM".

SUMMARY OF THE INVENTION

On the other hand, video CDs are equipped with not only a function to merely reproduce moving picture data, but also a so-called "playback control function". That is, a still picture (image) such as a menu screen is reproduced, and the reproducing operation is carried out in an user interactive form.

In the above-described playback function, the menu screen recorded as the still picture data is reproduced, and then the user performs the selection operation in accordance with the content of this menu screen. Then, the data corresponding to the selection tree selected by the user is reproduced. The moving picture data, the still picture data, the audio data and the like are employed which may be designated as the reproduced selection tree.

In particular, the still image such as the menu screen, and the still picture reproduced based on the menu selection are recorded on a predetermined region on a disc as the segment play item, which is independent from the moving picture data. There are some possibilities that a segment play item may be handled as moving picture data.

On the other hand, when data is read out from a disc, a portion of read data may be possibly dropped out due to adverse influences by disturbance such as defects and finger prints.

When the still picture data is reproduced, a great problem may occur if data is dropped out during the data reading operation of the disc.

In other words, in the case that the still picture data is reproduced, since the data about one screen which have been once read out from the disc are continuously outputted for a preselected time period, the data portion when a portion of the data read from the data is lost would not be eventually displayed on the screen.

For instance, such a trouble may happen to occur that if a portion of a menu image is lost which is required for user selections, then the user cannot make any menu selection.

To solve the above-described problems, according to the present invention, in a reproducing apparatus for reproducing a recording medium on which both of still picture data having at least variable data length, and data length information corresponding to the still picture data have been recorded, this reproducing apparatus is characterized by comprising:

a reader for reading out both of said still picture data and said data length information corresponding to the still picture data from the recording medium;

a decoder for decoding the still picture data and also the data length information corresponding to said still picture data, which are read out by said reader;

a counter for counting a data length of said still picture data decoded by said decoder;

a comparator for comparing the data length information decoded by the decoder with the data length counted by said counter; and a controller for making such a judgement that the data is dropped out by way of said comparator when the data length information decoded by the decoder is not coincident with the data length of the still picture data counted by the counter, and for controlling said reader to again read out the same still image data.

Furthermore, according to the present invention, it is to provide a decoder comprising:

a memory controller for controlling read/write operations of still picture data from/into a memory, which has been reproduced from a recording medium on which the still picture data having at least variable data length and data length information corresponding to the still picture data have been recorded;

a picture data length calculator for calculating a picture data length corresponding to one screen based upon a starting address and an end address by detecting header information from said reproduced still image data;

a separator for separating picture information and variable length data from said reproduced still image data;

a comparator for comparing the variable length data separated by said separator with the picture data length calculated by said calculating means; and a generator for generating a variable length data error signal when said comparator Judges that the variable length data separated by the separator is not coincident with the picture data length calculated by said calculator.

BRIEF DESCRIPTION OF THE DRAWINGS

FIG. 1 is an explanatory diagram for explaining an XA format of a CD-ROM;

FIG. 3A schematically indicates a structure of data recorded in the MPEG system;

FIG. 3B is a schematic diagram for representing a method for forming a P-picture;

FIG. 3C is a schematic diagram for representing a method for forming a B-picture;

FIG. 3D schematically indicates a sequence of a decoded data which has been recorded in the MPEG system;

FIG. 3E is a schematic diagram for illustrating such a mode that the data recorded in the MPEG system is encoded to b transmitted as a video data stream;

FIG. 6A is an explanatory diagram for indicating a recording format of a CD-DA disc;

FIG. 6B is an explanatory diagram for indicating a recording format of a video CD disc;

FIG. 6C indicates a structure of data recorded at a program number 1 in case of the video CD disc;

FIG. 7 is an explanatory diagram for explaining a frame structure;

FIG. 8A is an explanatory diagram for showing subcode data;

FIG. 8B is an explanatory diagram for indicating a structure of sub-Q data;

FIG. 10 is an explanatory diagram for indicating TOC data;

FIG. 12 is an explanatory diagram for explaining a PVD (principle volume descripter) of a video CD;

FIG. 14 is an explanatory diagram for explaining disc information in the information area of the video CD;

FIG. 16 is an explanatory diagram for indicating a list ID offset table of the video CD;

FIG. 17 is an explanatory diagram of showing a play list of the video CD;

FIG. 18 is an explanatory diagram of indicating a play item number of the video CD;

FIG. 19 is an explanatory diagram of representing a section list of the video CD;

FIG. 21 is an explanatory diagram for explaining a playback control operation by the list structure of the video CD;

DESCRIPTION OF THE INVENTION

Figure 2:
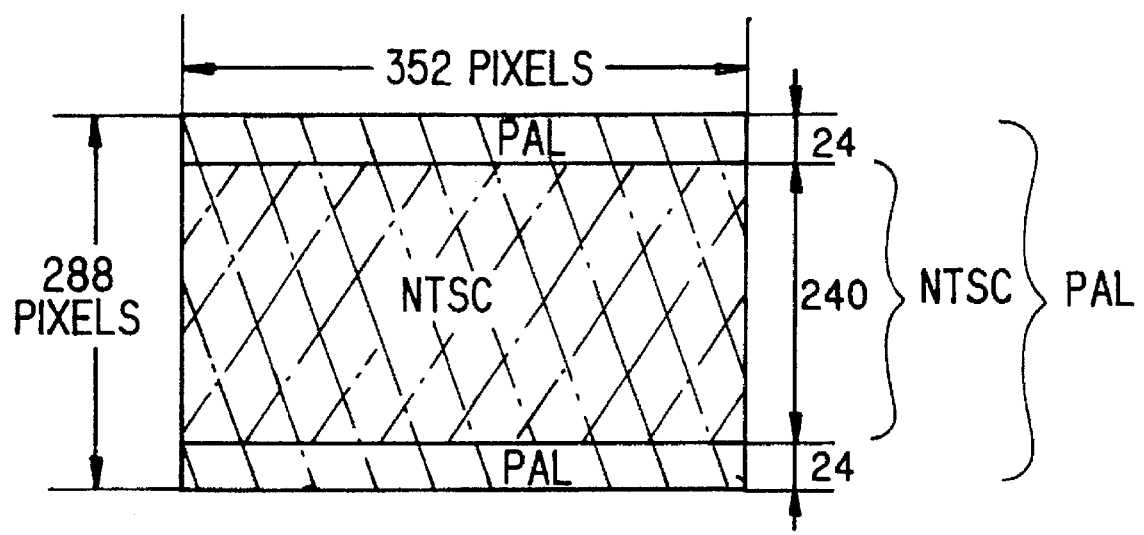
FIG. 2 is an explanatory diagram for explaining screen sizes of the NTSL/PAL systems.

Now, a description will be made of a reproducing apparatus capable of reproducing video (picture)/audio information about a video CD and a CD-DA (digital audio CD and CD-G) as an embodiment of the present invention. As a video CD, there is a reproducing apparatus additionally equipped with a playback control function. According to this embodiment, the first-mentioned reproducing apparatus may have such a playback control function.

The description will be made in accordance with the following sequence.

I. DATA STRUCTURE OF VIDEO CD
 1. Data mode
  a. video data,
  b. audio data,
  c. management data.
 2. Track structure
 3. Sector structure
 4. Arrangement on disc
 5. TOG and Subcode
 6. Directory structure
 7. Video CD data track
  a. PVD (principle volume descriptor)
  b. Video CD information
   -b1- disc information,
   -b2- entry table,
   -b3- list ID offset table,
   -b4- PSD (play sequence descriptor)
    * play list,
    * selection list,
    * end list.
  c. Segment play item
II. PLAYBACK CONTROL (PBC)
 1. List structure,
 2. Concrete example.
III. ARRANGEMENT OF REPRODUCING APPARATUS
 1. Outer appearance,
 2. Circuit block.
IV. OPERATION DURING REPRODUCTION OF STILL PICTURE I. DATA STRUCTURE OF VIDEO CD
 1. Data mode A video CD standard is defined as follows. The MPEG (Moving Picture Coding Experts Group) system standardized as the high efficiency coding technique is utilized, and moving picture and audio data can be reproduced from a CD-ROM disc for longer than 60 minutes. As a consequence, this video CD standard is useful as a home-use software such as music, movie pictures, and KARAOKE, and as an educational software, an electric publishing software, and a game software in combination with a still picture.

In this video CD, moving picture data is compressed based upon the MPEG system, and this moving picture data is multiplex on audio data for recording purposes. Furthermore, the management data required for the reproducing operation is recorded on a preselected region.

In FIG. 1, there is indicated a format about data of a video CD (XA specification).

a. Video Data

As apparent from FIG. 1, as a video recording format and an audio recording format, 1.152 Mbits/sec is allocated to video data and 64 Kbits/sec to 384 Kbits/sec are allocated to audio data. A pixel size (dimension) of the video data (moving picture) is given as follows: (352×240) pixels are allocated in the case of the NTSC (National Television System Committee) signal (29.97 Hz) and a film (23.976 Hz), whereas (52×288) pixels are allocated in the case of the PAL (Phase Alternation by Line System) signal (25 Hz).

As a pixel number (quantity) of a still picture, (352×240) pixels are allocated in the case of the normal level of the NTSC system, and (704×480) pixels are allocated in the case of the high definition (precision) level of the NTSC system. (352×288) pixels are allocated in the case of the normal level of the PAL system, and (704×576) pixels are allocated in the case of the high definition level of the PAL system.

The compressing/coding operation of video data (moving picture) is carried out in accordance with the MPEG system as follows: Assuming now that a video (picture) signal before being compressed is of the NTSC system, a video signal is constructed of 30 frames per 1 second In this case of the NTSC system.

In accordance with the MPEG system, a video signal is subdivided into 330 blocks (22 blocks in horizontal direction and 15 blocks in vertical direction within 1 frame), data in each block is DCT (Discrete Cosined Transfer)-transferred, and the transferred data is re-quantatized to reduce a high frequency component thereof to zero so as to further reduce a total number of bits. Then, these blocks are rearranged to construct a rectangular shape in such a manner that the start block through the end block are arranged in a zig-zag form within this rectangular shape from the upper left corner of the 1 frame screen block to the lower right corner thereof. A run length coding process is performed so as to further compress a total number of bits.

With respect to the respective frames of the video signal compressed in this manner, the video information about the temporally front and rear frames is very resemblance to each other. The information is further compressed by utilizing this feature, and three different sorts of video data whose compression degrees are different from each other are provided with respect to the video data of 1 frame.

These three sorts of video data are referred to an I-picture (Intra Picture), a P-picture (Predicted Picture), and a B-picture (Bi-directionally predicted Picture).

Then, generally speaking, as represented in FIG. 3A, with respect to each of 30 frames for 1 second, an I-picture, a P-picture, and a B-picture are arranged.

In this case, for instance, the frames with 15 frame intervals are set as I-pictures I1 and I2, 8 frames of P-pictures P1 to P8 as well as 20 frames of B-pictures B1 to B20 are arranged as shown in this drawing. A section defined from a certain I-picture to a frame before the next I-picture is referred to a GOP (Group of Picture).

As previously described, an I-picture corresponds to normal picture data coded by the DCT transfer.

As indicated in FIG. 3B, a P-picture is produced by coding the close most I-picture, or the close most P-picture with employment of movement compensation. For instance, the P-picture P1 is formed based upon the I-picture I1, or the P-picture P2 is formed based on the P-picture P1.

Thus, the above-described P picture is such a further compressed picture, as compared with the I-picture. It should be understood that since P-pictures are sequentially formed from the preceding I-pictures or P-pictures, when an error happens to occur in the previous P-picture, or the previous I-picture, this error would be propagated to the next P-picture.

A B-picture is produced by employing either a past I-picture and a future I-picture, or a past P-picture and a future P-picture, as represented in FIG. 3C.

For example, the B-pictures B1 and B2 are formed by using the I-picture I1 and the P-picture P1, and the B-pictures B3 and B4 are formed by employing the P-picture P1 and the P-picture P2.

A B-picture corresponds to the highly compressed data, as compared with the compressed P-picture. Since this B-picture does not constitute a data forming reference, no error is propagated.

In accordance with the algorithm of the MPEG system, there is no specific rule about a position and a synchronization of an I-picture on a recording medium, but these position and synchronization are allowed to be arbitrarily selected. This position/synchronization selection is determined based on various conditions of random access degrees and scene cutting. For example, when the random access degrees are especially considered, as shown in FIG. 3A, at least two sets of I-pictures are required within 1 second.

Moreover, it is possible to select presence degrees of the P-picture and the I-picture within 1 frame. This selection is made by a memory capacity of an encode means.

The encode means in the MPEG system rearranges the picture data stream to be outputted in order that the efficiency in the decoder is increased.

For instance, in the case of FIG. 3A, the frame sequence to be displayed (decoder output sequence) is given by the frame number as shown in the lower portion of FIG. 3A. In order that the B-picture is recombined by the decoder, the P-picture is required which is present before this B-picture and constitutes a reference. As a result, on the encoder side, the frame sequence as shown in FIG. 3D is rearranged as indicated in FIG. 3E, and the rearranged pictures are transferred as a picture data stream.

b. Audio Data

The audio data format of the MPEG system corresponds to the coding speeds from 32 Kbits/sec. to 448 Kbits/sec. in a wide range. It should be understood that the coding speed of 224 Kbits/sec. is employed as to the moving picture track after the track 2, taking account of an easy software magnification and a high sound quality. The sampling frequency is selected to be 44.1 KHz similar to that of the CD-DA.

c. Management Data

Video data and audio data, and also management data used to perform various controls of reproducing operations for these data are recorded on a video CD.

That is, similar to a CD-DA, a TOC (Table of Contents) and a subcode are recorded on a video CD by which a program number and starting positions (absolute times) of the respective programs are indicated.

Furthermore, a program No. 1 is utilized as a video CD data track in a video CD, and various sorts of management information is recorded on the above-described program No. 1. Also, a playback control operation (will be discussed later) is realized by employing the data appearing in the video CD data track of the above-described program No. 1.

These management data will be discussed later in detail.

2. Track Structure

Figures 4A, 4B:
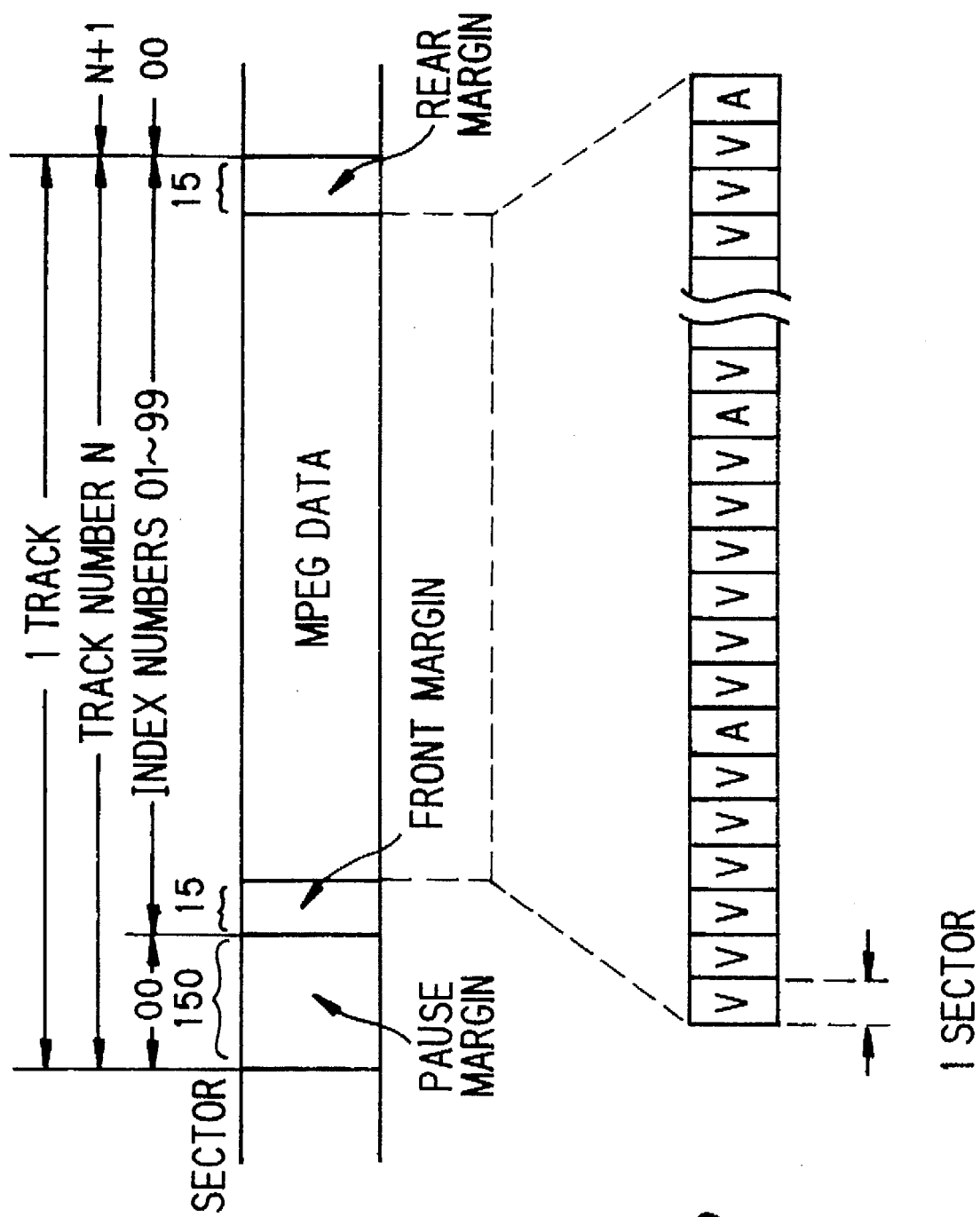
FIG. 4A schematically indicates a structure of data recorded in unit of a single program.
FIG. 4B shows a constructive ratio of the video data to the audio data, contained in the MPEG data having the above-explained data structure.

Such a data structure of a program on which video data and audio data are recorded where, for instance, a piece of music constitutes 1 program unit data is illustrated in FIG. 4A.

Similar to a CD-DA, assuming that a retrieve operation is carried out based on a program number, a pause margin of 150 sectors is established at a head of 1 program.

Furthermore, 15 sectors subsequent to the pause margin are provided as a front margin, and final 15 sectors of a program are provided as a rear margin, which are used as an empty data region.

A region between the above-described front margin and rear margin is used as an MPEG data region. As shown in FIG. 4B, both of sectors V constituting the video data and sectors A constituting the audio data are time-divisionally multiplex to be recorded by way of the interleaving manner in the MPEG data region in such a manner that a ratio of the sectors V to the sector A is 6:1.

3. Sector Structure

Figure 5A:
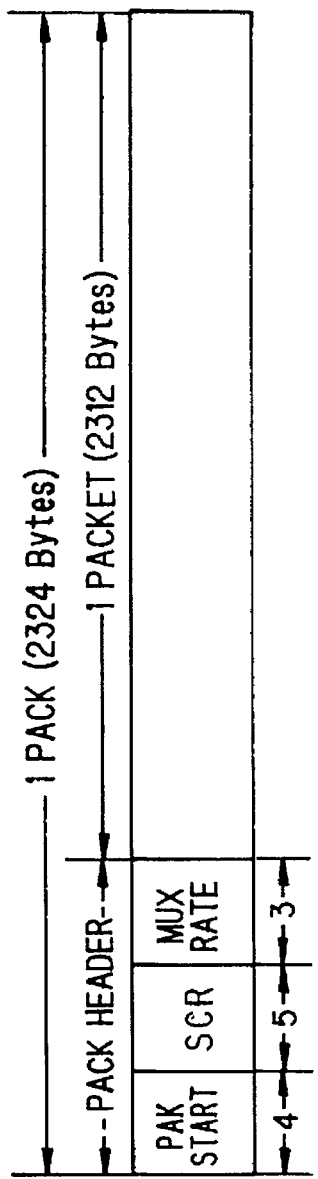
FIG. 5A is an explanatory diagram for indicating a basic structure of a sector.
Figure 5B:
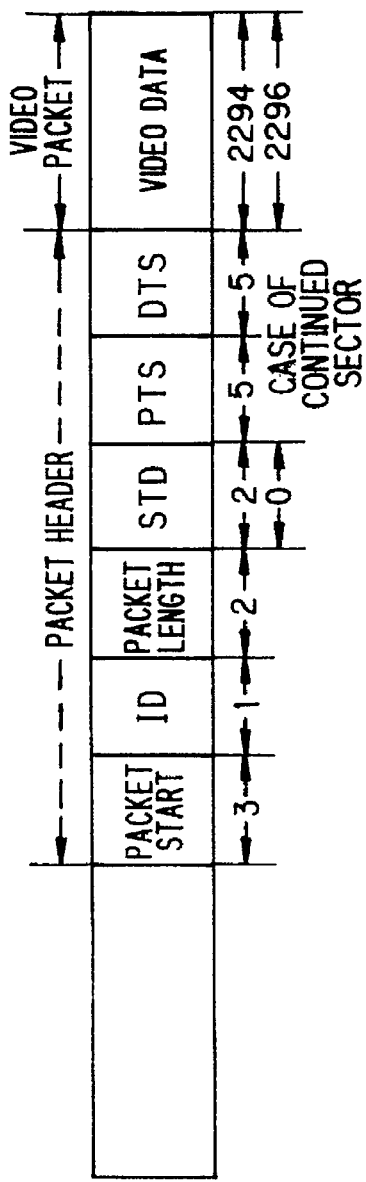
FIG. 5B schematically shows a structure of data when the above-described sector is employed as the video sector.
Figure 5C:
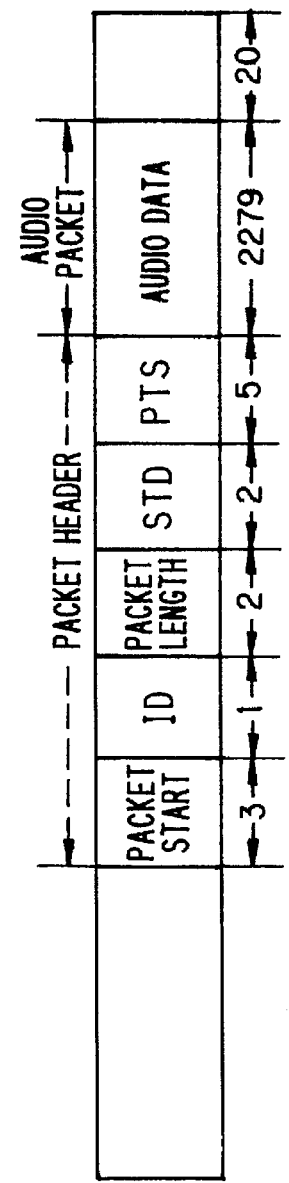
FIG. 5C is an explanatory diagram for explaining a structure of data when the above-described sector is employed as the audio sector.

A structure of a sector constituting a single data unit within a track is represented n FIGS. 5A to 5C.

FIG. 5A indicates a basic structure of a sector.

1 sector is constructed of 2324 bytes of packs formed by a pack header and pack data.

The 12-byte pack header is provided at a head portion of the sector, and the remaining 2312 bytes are 1 packet.

In the pack header, there are provided, first, a 4-byte pack start code, and subsequently 5-byte system clock reference (SCR), and finally a 3-byte MUX rate.

The system clock reference (SCR) corresponds to a code having a meaning of one sort of absolute time. Based upon this SCR as a reference, a PTS (Presentation Time Stamp: Picture Output Starting Time) is determined (will be described later).

This SCR is expressed by $SCR(i)=C+(i \times 1200)$. The symbol "i" indicates an index number of a sector within a picture data stream. This index number "i" is selected to be "0" in the front margin portion of the head. Symbol "C" denotes a constant, i.e., is always "0". Numeral "1200" is such a value (9000/75=1200) at a system clock of 90 Hz in a 75 Hz sector.

It should be noted that this pack header is provided in all of the sectors V of the video data.

While such a pack header is employed in a sector constructed by 1 pack, a 2312-byte packet subsequent to the pack header is so arranged as one example, as shown in FIG. 5B when the sector is used as the sector for recording thereon the video data.

First, a packet header is provided at 18 bytes subsequent to the pack header.

3 bytes of the head portion of the packet header are used as a packet start code. Then, 1 byte of ID, 2 bytes of a packet length, 2 bytes of STD (System Target Decoder), 5 bytes of PTS, and 5 bytes of DTS (Decoding Time Stamp) are recorded. The PTS corresponding to the picture output start time is set so as to be synchronized with audio data. The DTS indicates a decode start time.

2294 bytes subsequent to this packet header are allocated as a video packet on which the video data is actually recorded. In other words, as explained above, the picture data stream constructed of the I-picture and the P-picture, and also the B-picture is recorded.

It should be noted that in the first video sector within such a section where the video sectors are continued, the video packet is defined as 2294 bytes, as explained before, but the STD in the packet header may be omitted in the subsequent continued video sectors, and the video packets may be expanded to 2296 bytes.

In the case that a sector corresponds to such a sector capable of recording audio data, as an example, a 2312-byte packet subsequent to the pack header is arranged as shown in FIG. 5C.

First, similar to the video sector, a packet header is provided subsequent to the pack header. This packet header is arranged by a 3-byte packet start code, a 1-byte ID, a 2-byte packet length, a 2-byte STD, and a 5-byte PTS, namely 13 bytes.

Then, 2279 bytes are allocated as an audio packet, and compressed digital audio data may be recorded on this audio packet. An empty area of 20 bytes is additionally provided after this audio packet, so that 1 pack (1 sector) of 2324 bytes is constructed.

The sector is arranged in the above-described manner. In this sector, time information for a synchronization purpose if SCR, DTS and PTS. That is to say, as illustrated in FIG. 4B, since the video sectors V and the audio sectors A are time-sequentially arranged within 1 track, the synchronization must be established among these sectors. The time information of SCR, DTS, PTS is utilized to perform this synchronization process.

In other words, while the time information SCR is employed as the reference clock, a time instant at which either the video packet, or the audio packet is commenced to be decoded based on the DTS in the respective sectors. Furthermore, at the PTS, a time instant is indicated when either the display is made, or the audio output is made.

As described above, the audio sector and the video sector are so arranged as to be mutually synchronized with each other based upon these time information.

4. Arrangement on Disc

Structures on a CD-DA disc and a video CD disc are shown in FIGS. 6A to 6C.

As shown in FIG. 6A, in a CD-DA disc, a lead-in area is provided at an innermost peripheral position of the disc, on which TOC data is recorded. As the TOC data, start positions, program numbers, play times and the like of the respective programs are recorded.

Subsequent to the lead-in area, program data are recorded as a program #1 to a program #n, and a lead-out area is provided at an outermost peripheral position. The digital audio data which has been quantized by 16 bits at a sampling frequency of 44.1 KHz is recorded together with the subcode data.

On the other hand, a structure on a video CD disc is indicated in FIG. 6B.

Substantially similar to the CD-DA, also in the case of the video CD, a lead-in area is provided at an innermost peripheral position of this disc, on which TOD data is recorded. Then, subsequent to the lead in area, a program #1 to a program #n are recorded, and a lead-out area is provided at an outermost peripheral position.

It should be noted that in the case of the video CD, the program #1 is not used to record either the actual video data, or the actual audio data as a first program, but is used as a video CD data track for recording the management data.

Then, the actual video data, or the actual audio data is recorded on the program #2 to the program #n. In other words, as explained with respect to FIGS. 5B and 5C, the program #2 to the program #n are arranged by the video sectors and the audio sectors as shown in FIG. 4B.

Also, in the case of the video CD, a program on which only the audio data has been recorded may be provided. In this case, similar to the CD-DA, the digital audio data quantized by 16 bits at the sampling frequency of 44.1 KHz is recorded.

It should also be noted that the maximum program number of any of the CD-DA and the video CD is limited to 99. As a consequence, in the case of the CD-DA, 99 pieces of program can be recorded at maximum, whereas in the case of the video CD, 98 sequences can be recorded at maximum. A "sequence" implies a single section of continued moving pictures. For example, when a picture such as KARAOKE is recorded, 1 piece of music (1 program) corresponds to 1 sequence. When a movie is recorded, a single disc normally corresponds to 1 sequence.

As represented in FIG. 6C, a PVD (principle volume descriptor), a KARAOKE basic information area, a video CD information area, a segment play item area, and other files (CD-I application programs etc) are prepared in the video CD data track with employment of the program #1. These areas will be explained later.

5. TOC and Subcode

A description now be made of the TOC and subcode recorded on a lead-in area in a video CD and a CD-DA.

A minimum unit of data recorded on the video CD and the CD-DA becomes 1 frame 98 frames constitute 1 block.

A structure of 1 frame is represented in FIG. 7.

1 frame is arranged by 588 bits, in which 24 bits at a head portion of this frame are allocated to sync data, and subsequent 14 bits are allocated to a subcode data area. Then, thereafter, data and a parity are arranged in the remaining frame portion.

The 98 frames having such a structure is arranged by 1 block, and the subcode data derived from the 98 frames are combined with each other to form subcode data of 1 block as indicated in FIG. 8A.

The subcode data derived from the first and second frames (namely, frame 98n+1, and frame 98n+2) provided at the head portion of the 98 frames are used as a sync pattern. Then, 96-bit channel data, namely the subcode data of P, Q, R, S, T, U, V and W derived from the third frame to the 98th frame (frame 98n+3 to frame 98n+98).

Among them, the P channel and the Q channel are employed so as to perform the management purposes, e.g., access operations. It should be noted that the P channel merely indicates the pause portions between the successive programs, and more precise controls are executed by the Q channels (Q1 to Q96). The 96-bit Q channel data is constructed as indicated in FIG. 8B.

4 bits of the Q channels Q1 to Q4 are allocated to control data which are used to identify, or discriminate the audio channel number, the emphasis operation, and the CD-ROM. That is, the 4-bit control data are defined as follows:

[0 * * *]—2-channel audio,
[1 * * *]—4-channel audio,
[* 0 * *]—CD-DA,
[* 1 * *]—CD-ROM,
[* * 0 *]—digital copy not allowable,
[* * 1 *]—digital copy allowable,
[* * * 0]—no pre-emphasis,
[* * * 1]—pre-emphasis.

Note that symbol "*" indicates "don't care".

Next, 4 bits of the Q channels Q5 to Q8 are allocated to addresses which are used as control bits of the sub-Q data.

When the 4-bit address becomes [0001], the sub-Q data of the subsequent Q channels Q9 to Q80 indicate audio Q data, whereas when the 4-bit address becomes [0100], the sub-Q data of the subsequent Q channels Q9 to Q80 denote video Q data.

Then, the Q channels Q9 to Q80 are allocated to 72-bit sub-Q data, and the remaining Q channels Q81 to Q96 are allocated to CRC.

In the lead-in area, the sub-Q data recorded thereon becomes the TOC information.

Figure 9A:
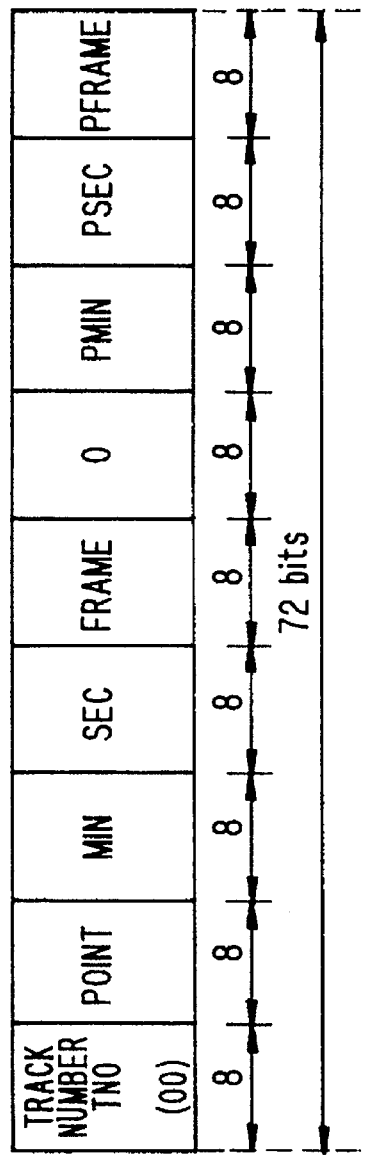
FIG. 9A is an explanatory diagram for explaining the sub-Q date in a lead-in area.

That is, the 72-bit sub-Q data of the Q channels Q9 to Q80 as to the Q-channel data read out from the lead-in area contain such an information as shown in FIG. 9A. Each of the sub-Q data contains 8-bit data.

First, a track number is recorded. The track number is fixed to [00] in the lead-in area.

Next, "POINT (point)" is described, and further, "MIN (minute)", "SEC (second)", and "FRAME (frame number)" are indicated as an elapse of time within a program.

Furthermore, "PMIN", "PSEC" and "PFRAME", are recorded. These "PMIN", "PSEC" and "PRAME" are defined by the values of "POINT".

When the value of "POINT" is "01" to "99", these values imply the program numbers. In this case, as to these PMIN, PSEC, PFRAME, a program start button (absolute time address) of this program number is recorded as a minute (PMIN), a second (PSEC), and a frame number (PFRAME).

When the value of POINT is "A0", the track number of the first program is recorded in the PMIN. The sorts of discs are defined by the value of PSEC, for example, CD-DA, CD-I,and CD-ROM (XA specification).

When the value of POINT becomes "A1", the program number of the last program is recorded on the PMIN.

When the value of POINT becomes "A2", a start point of the lead-out area is indicated as an absolute time address in PMIN, PSEC and PFRAME.

For instance, when 6 programs are recorded on the disc, as shown in FIG. 10, data are recorded as the TOC by such sub-Q data.

As indicated in FIG. 10, all of the program numbers TNO are "00".

A block No. indicates one unit of sub-Q data which have been read as the block data by the 98 frames, as explained before.

The same content of the respective TOC data is written over three blocks.

As indicated in this drawing, when the POINT is "01" to "06", start points of the program #1 to the program #6 are indicated as PMIN, PSEC, and PFRAME.

Then, when the POINT becomes "A0", "01" is indicated as a first track number in the PMIN. The sort of disc is discriminated based on the value of the PSEC. When this disc is a CD-ROM (XA specification), as represented in the drawing, the PSEC="20". When this disc is a CD-DA, the PSEC="00". When this disc is a CD-I, the PSEC="10".

Then, the value of this POINT is recorded on a position of "A1", and the track number of the final program is recorded on the PMIN (in this case, track number is 6). The value of the POINT is shown at a position of "A2", and start points of the lead-out areas are indicated in the PMIN, PSEC, and PFRAME.

After the block n+27, the contents of the block n to the block n+26 are again repeatedly recorded.

Figure 9B:
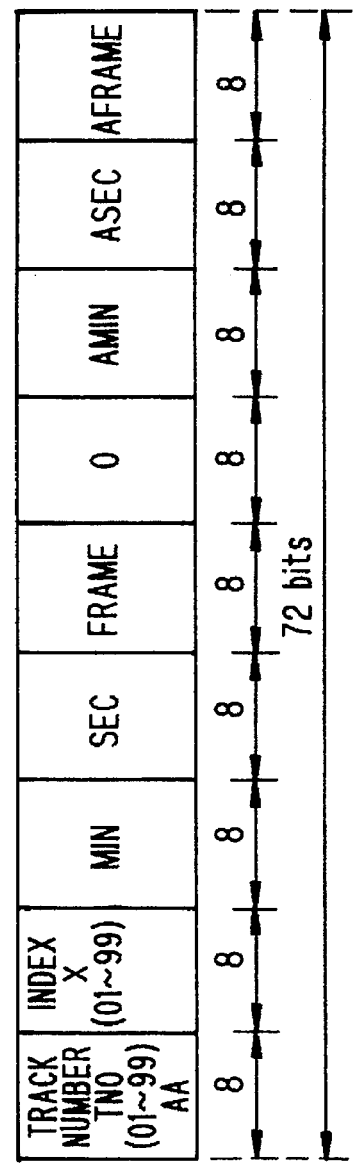
FIG. 9B is an explanatory diagram for explaining the program and the sub-Q data in a lead-out area.

In the programs #1 to #n and the lead-out area, the sub-Q data recorded therein contain information as shown in FIG. 9B.

First, a track number is recorded. That is, any one of "01" to "99" is recorded in the respective programs #1 to #n. A program number in the lead-out area is "AA".

Subsequently, as an index, information capable of subdividing the respective programs is recorded.

Then, as an elapse of time within a program, there are indicated MIN (minute), SEC (second), and FRAME (frame number).

Furthermore, as AMIN, ASEC and AFRAME, absolute time addresses are recorded as a minute (AMIN), a second (ASEC), and a frame number (AFRAME).

6. Directory Structure

Figure 11:
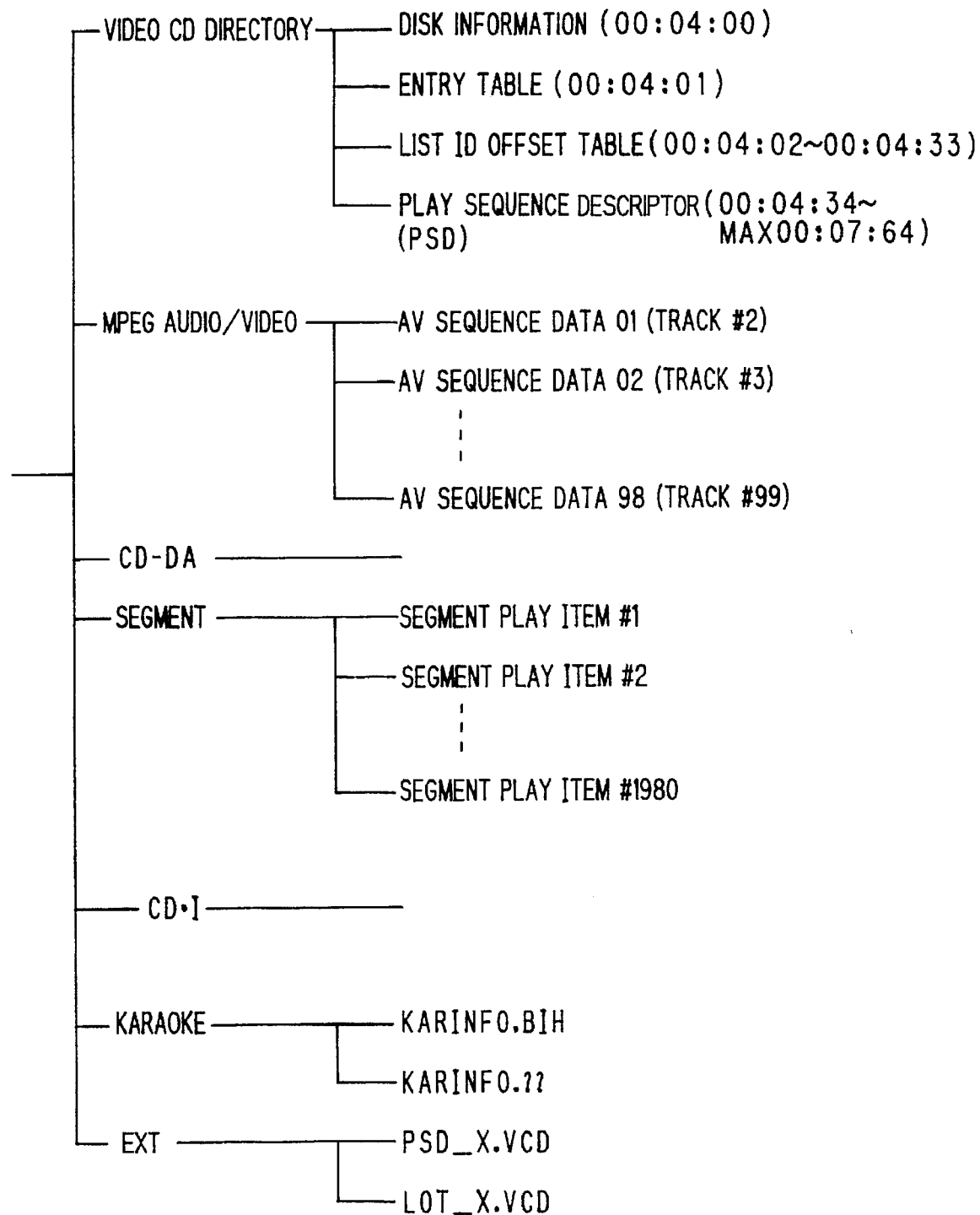
FIG. 11 is an explanatory diagram for showing a directory structure of a video CD.

A directory structure of a video CD is represented in FIG. 11.

In the video CD shown in FIG. 6B, as the directory structure, as indicated in FIG. 11, a video CD directory, an MPEG audio/video, a CD-DA, a segment, a CD-I, a KARAOKE, and a EXT are required.

The video CD directory is recorded in the video CD information area within the program #1 of FIG. 6B. Disc information, an entry table, a list ID offset table, and a play sequence descriptor are provided, which will then be discussed later.

The MPEG audio/video corresponds to namely audio/video sequence data. In other words, in such a video CD capable of recording 99 tracks at maximum, 98 pieces (maximum) of sequence data can be recorded from the program #2 to the program #99.

The segment is such segment play items #1 to #1980 by which 1980 units can be recorded at maximum. This is recorded in the segment play item within the program #1.

Furthermore, in the CD-I application program within the program #1, this directory file is assembled into the directory structure as the CD-I. When the KARAOKE basic information area is utilized, this directory file is assembled as the KARAOKE into the directory structure.

When such a track on which only the audio data is recorded is employed, this directory file is assembled into the directory structure as the CD-Da. When the PSD-X.VCD and LOT-X.VCD are used, the directory files thereof are assembled into the directory structure as the EXT.

7. Video CD Data Track

As previously explained, the program #1 is used as the video CD data track in the video CD.

As previously described with employment of FIG. 6C, there are provided the PVD (principle volume descriptor), KARAOKE basic information area, video CD information area, segment play item area, and other files (CD-I application program etc.).

As indicated in FIG. 6C, the PVD is arranged at a position on the disc from an absolute time address of 00:02:16 (minute/second/frame).

The KARAOKE basic information area is arranged at a position on the disc from the absolute time address of 00:02:16.

The video CD information area is arranged at a position on the disc from an absolute time address of 00:04:00.

Then, the segment play item area is arranged from a position indicated in the video CD information area, and the CD-I application program is arranged from a position indicated in the PVD.

a. PVD (Principle Volume Description)

A structure of the PVD (principle volume descriptor) arranged at the position on the disc from the absolute time address of 00:02:16 is represented in FIG. 12.

First, as a volume structure standard ID, data of "CD001" is recorded. Subsequently, a system identifier, a volume identifier, a volume number of an album, and an album set sequence number are recorded. There are some cases that either a single album is constructed of a single disc, or a single album is arranged by a plurality of discs. The volume number of the album is equal to a total number of discs in a single album. Then, the album sequence number indicates which sequence of a disc in question is present within these discs.

Then, a logic block size, a bus total, an address of the bus table, and a route directory record are recorded.

Also, a disc title is recorded as the album identifier, and subsequently an issuer and a write name are recorded.

Furthermore, an application name of a CD-I is recorded as the application identifier.

Next, a copyright file name, an abstract file name, an index file name, a formation date, a correction date, an expiration date, an effective date, a file structure standard version number, and finally an XA label code are recorded.

b. Video CD Information

The video CD information is recorded at a position on the disc from the absolute time address of 00:04:00.

Figure 13:
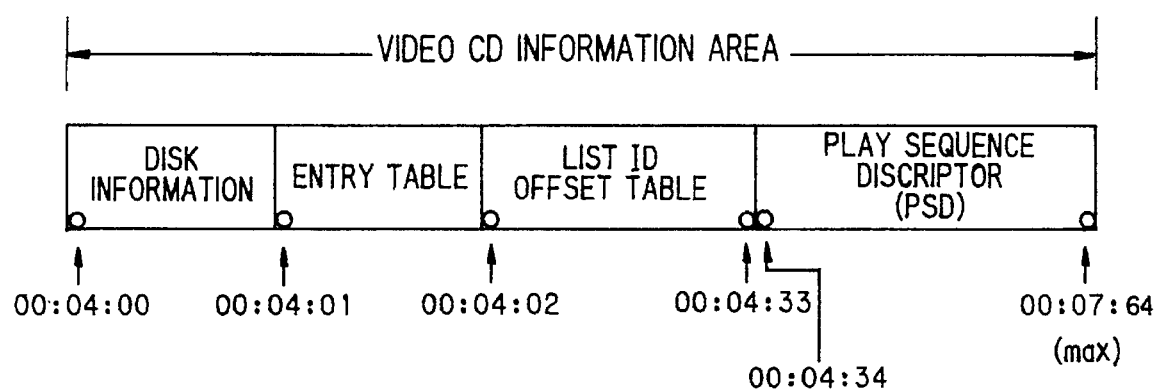
FIG. 13 is an explanatory diagram for explaining an information area of a video CD.

As indicated in FIG. 13, as this video CD information, disc information, an entry table, a list ID offset table, and a play sequence descriptor (PSD) are provided. These may constitute the respective files in the video CD directory shown in FIG. 11.

The disc information is arranged at a position on the disc corresponding to the head position of the video CD information from the absolute time address of 00:04:00.

The entry table is arranged at a position from an absolute time address of 00:04:01.

The list ID offset table is arranged at positions defined from an absolute time address of 00:04:02 to an absolute time address of 00:04:33.

The play sequence descriptor (PSD) is arranged at a position from an absolute time address of 00:04:34 up to an absolute time address of 00:07:64 at maximum.

-b1- Disk Information

The disc information arranged from the absolute time address of 00:04:00 will now be first explained.

A region of the disc information has such a structure as shown in FIG. 14.

First, the system identifier of the video CD is recorded in the first byte to the eighth byte.

Subsequently, the version number is recorded in two bytes from the 9th byte to the 10th byte. In case of the version 2.0, this version number becomes "$0200".

Then, the album identifiers specifically given to the respective discs are recorded in 16 bytes from the 11th byte to 26th byte.

The volume number in the album is recorded in 2 bytes from the 27th byte to the 28th byte, and the album set sequence number is recorded in the subsequent 2 bytes. There are some cases that either a single album is constructed of a single disc, or a single album is constructed of a plurality of discs. The volume number of the album becomes the disc number in this single album. Then, the album set sequence number indicates which sequence of the disc in question is present within the discs.

A size map of a moving picture track is recorded in 13 bytes from the 31st byte to the 43rd byte. This size map corresponds to data used to discriminate that the data about the respective programs #2 to #99 are the NTSC signal, or the PAL signal. In other words, an LSB (least significant byte) of the first byte among the 13 bytes indicates the program #2, and the 1-bit data up to the program #99 are recorded until the bit 1 of the last byte. When the bit Corresponding to the respective programs is equal to "0", this bit indicates the NTSC system. When this bit is equal to "1", this bit indicates the PAL system.

The status flag is recorded in 1 byte at the 44th byte. In this 1 byte, a bit "0" is used as a flag of the KARAOKE basic information among the bit "0" to the bit "7".

When the bit "0" is equal to "0", there is no KARAOKE basic information. When the bit "0" is equal to "1", it is indicated that the KARAOKE basic information is recorded from the sector of the absolute time address of 00:03:00.

A byte size of the PSD (play sequence descriptor) is indicated in 4 bytes from the 45th byte to the 48th byte. As shown in FIG. 13, the PSD is recorded from the absolute time address of 00:04:34 to the absolute time address of 00:07:64 at maximum. Since the byte size is variable, the byte size is indicated in the above-described 4 bytes.

As will be described later, the PSD is constructed as a plurality of lists (section list, play list, end list) used in the playback control, and the respective lists are recorded as the PSDs. It should be noted that when there is no PSD, namely there is a disc having no playback control function, the above-described 4 bytes are set to "0".

The first segment address is indicated in 3 bytes from the 49th byte to the 51st byte. As shown in FIG. 6C, it has been described that the start point of the segment item area is recorded in the video CD information area, and the above-described 3 bytes correspond to it.

As will be described later, with respect to the segment play item, 1980 pieces of segment play items at maximum can be recorded in the segment play item shown in FIG. 6C. As the respective segment play items, the video data and the audio data, which are employed as the playback control are recorded.

The offset multiplier is recorded in 1 byte at the 52nd byte. This is such a multiplier employed to calculate the address of the respective lists in the PSD, and is fixed to "8" in this case.

The number of list ID is indicated in 2 bytes from the 53rd byte to the 54th byte. This represents the quantity of effective ID recorded in a list ID offset table (will be discussed later).

The number of segment play item recorded in the segment play item area is indicated in 2 bytes from the 55th byte to the 56th byte.

The segment play item content table is recorded in 1980 bytes from the 57th byte to the 2036th byte. This indicates attributes of the respective segment play items recorded in the segment item area.

Figure 15:
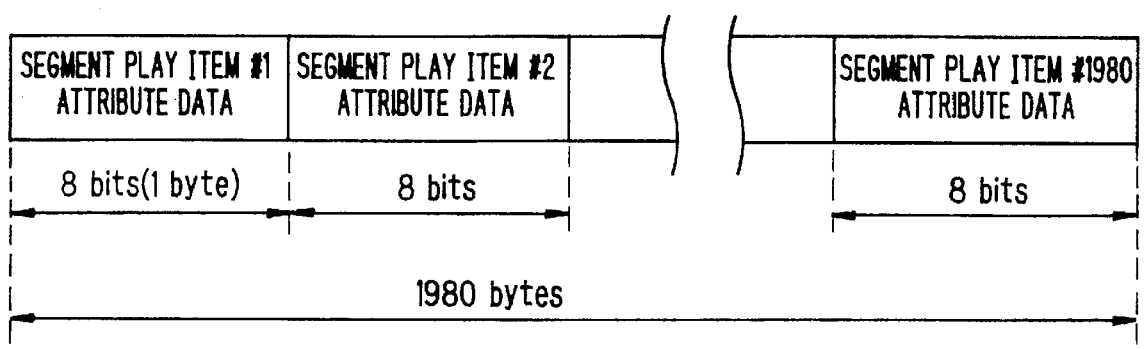
FIG. 15 is an explanatory diagram for showing a segment play item content table in the disc information of the video CD.

That is, 1980 pieces of segment play items may be recorded as #1 to #1980 at maximum. As illustrated in FIG. 15, in this segment item content table, the attribute data are recorded in correspondence with the segment play items #1 to #1980 every 1 byte.

As to the respective bits (bit "0" to bit "7") of 1 byte, the attribute data are defined as follows: Note that the bit 6 and the bit 7 are not yet defined.

Bit 1, Bit 0=[00]—no MPEG audio data,
[01]—monophonic (monaural) audio data,
[10]—stereo audio data,
[11]—dual channel audio data.
Bit 4 to Bit 2:
[000]—no MPEG video data,
[001]—normal level still picture data in NTSC size,
[010]—high precision level still picture data in NTSC size,
[100]—unused,
[101]—normal level still picture data in PAL size,
[110]—normal/high precision level still picture data in PAL size,
[111]—moving picture data in PAL size.
Bit 5:
[0]—solo item, or head item of continuous items,
[1]—second item and subsequent items thereof among continuous items.

The disc information defined from the 2037th byte to the 2048th byte is undefined subsequent to such a segment play item content table.

-b2- Entry Table

As represented in FIG. 13, in the video CD information area, the entry table is arranged from the absolute time address of 00:04:01.

In this entry table, a predetermined pint within either the audio sequence, or the video sequence may be entered as a starting point.

As a result, an ID corresponding to the entry file, a version number, and an entry number are recorded in this entry table 500 entries are recorded as the actual entry points at maximum. In other words, the entries from #0 to #499 may be set.

A single entry is constructed of 4 bytes, and the track number is indicated by 1 byte among these 4 bytes, and also the sector address, i.e., ASEC, AMIN, AFRAME are indicated by the remaining 3 bytes.

-b3- List ID Offset Table

The list ID offset table is arranged in the sectors of the video CD information area from an absolute time address of 00:04:02 to an absolute time address of 00:04:33.

A list ID is specifically attached to a play list and a selection list, which are recorded in a PSD (will be discussed later). In this list ID offset table, an offset amount indicative of the position of each list in the PSD is indicated. Then, when a desired list to be reproduced is designated by a user, this video CD reproducing apparatus may grasp the position of the designated list within the PSD with reference to the list ID offset table, so that the content of the designated list can be executed.

As shown in FIG. 16, the list ID offset table is arranged by 32 sectors at maximum, the offset amounts are indicated by each two bytes, and the 64-kbyte offset is represented.

An area of PSD (will be discussed later) is defined from an absolute time address of 00:04:34 to an absolute time address of 00:07:64 at maximum, namely this PSD area becomes such an area of 3 seconds 31 frames. This corresponds to 256 sectors 256 sectors correspond to 512 Kbytes.

A value obtained by multiplying the offset value of 64 Kbytes by 8, which is represented in the list ID offset table, becomes 512 Kbytes. Numeral "8" corresponds to an offset multiplier at the 52nd byte of the disc information shown in FIG. 14.

In other words, the offset becomes a numeral value for indicating a predetermined position in the PSD area as the byte position from the PSD head position (position of offset "0000") by multiplying the offset value by the offset multiplier "8" while 1 offset corresponds to 8 bytes.

First, a start-up offset is recorded. This is fixed to a value of "$0000".

This FIG. 16 shows such a case that the number of list ID is 6, and the respective offset values as to the list ID1 to the list ID6.

It should be noted that as to the list ID1 arranged at the head of the PSD, the offset value is fixed to the value of "$0000".

Also, with respect to the unused list ID, the offset value is set to "$FFFF".

-b4- PSD (play sequence descriptor)

The PSD is provided at a position from an absolute time address of 00:04:34.

In this PSD, a play list, a selection list, and an end list are recorded. These lists are employed in a playback control (will be discussed later), in which the data indicative of the content of reproduction, and the hierarchical branch are recorded.

The play list does not contain data used to be branched to the lower hierarchy (selection menu), and corresponds to a list for designating a series of contents to be reproduced.

On the other hands, the selection list is such a list containing the data used to be branched to the lower hierarchy (selection menu).

It should be noted that the list which should be first reproduced (play list, or selection list) is the list ID1, and is recorded at a head position (position of offset "00002) of the PSD.

* Play List

The play list for designating a series of contents to be reproduced is arranged as shown in FIG. 17.

First, a 1-byte play list header is provided and indicates that this list corresponds to the play list.

Subsequently, as a number of item, the quantity of play items recorded in this play list is represented. The play item corresponds to such a data for indicating the content to be reproduced. The data for designating the play items are recorded in the play list as the play item number #1 to the play item number #N.

The list ID specific to the respective lists is recorded in 2 bytes subsequent to the number of item.

Subsequently, a previous list offset, a next list offset, and a return list offset are each recorded in 2 bytes.

The previous list offset indicates a position (offset) of the list which should be advanced when the previous operation is performed. For example, when a position of a list located at an upper one stage is designated by the previous list offset, e.g., when the list is made hierarchical, the user can return to the operation condition by the previous list by the previous operation.

When the previous list offset is equal to "$FFFF", it is prohibited to execute the previous operation.

The next list offset indicates a position of a list which should be continuously advanced either when the reproducing operation designated by this play list is accomplished, or when the next operation is performed.

The return list offset indicates a position of a list which should be advanced when the return operation is performed. For example, when the list is made hierarchical, if a position of a list located at the highest stage is designated by the return list offset, then the user may return to the operation condition by the list at the highest stage by carrying out the return operation.

Next, a playing time of 2 bytes, a play item wait time of 1 byte, and an auto pause wait time of 1 byte are recorded.

The playing time indicates the number of sectors of the reproducing operation based on this play list.

The play item wait time indicates a wait time when the reproducing operation of each play item is ended. The wait times "0" to 2000 seconds are indicated by "$00" to "SEE". In case of "$FF", it implies that user's operation is waited.

The auto pause wait time indicates a wait time during the auto pause operation.

Finally, the numbers as to the play items #1 to #N to be reproduced are each indicated by 2 bytes.

This play item number (PIN) is defined as indicated in FIG. 18.

When PIN="0", or "1", this play item is not reproduced.

When PIN="2" to "99", this PIN represents the track number. For example, when PIN="5", this play item becomes a play item for reproducing a track #5.

When PIN="100" to "599", this value (PIN-100) indicates the entry of the entry table. As previously described, the entry table may indicate 500 entry points as the entries #0 to #499 at maximum. As the value (PIN-100) thereof, any of entry numbers #1 to #500 is designated.

When PIN="100" to "2927", the value (PIN-999) thereof represents the number of segment play item. In the segment play item area, 1980 pieces of segment play items may be recorded at maximum. As the value (PIN=999), any of segment play items #1 to #1980 is designated.

Both of PIN="600" to "999" and PIN="2980" to "$FFFF" are not defined.

For example, the three play items are recorded in the play list, assuming now that the play item #1 number was "04", the play item #2 number was "1001", and the play item #3 number was "102".

Then, in the reproducing operation executed by this play list, the track #4 is first reproduced, subsequently the segment play item #2 is reproduced, and finally, the tracks by the entry #3 from the entry point are reproduced.

* Selection List

The selection list is such a list to reproduce a selection menu so as to cause a user to select an operation to be processed. A structure of this selection list is shown in FIG. 19.

First, a 1-byte selection list header is provided which indicates the selection list.

Subsequently, in an used 1 byte, a selection branch number in this selection list is recorded. The maximum selection branch number is 99.

Next, the first number of the selection branch is indicated. This first number is normally "1". However, when there are many selection branches to be set and therefore a plurality of selection lists are employed, a first selection branch number in the second, or subsequent selection list is indicated.

Subsequently, list IDs specific to the respective lists are recorded by 2 bytes.

Then, similar to the play list, a previous list offset, a next list offset, and a return list offset are each recorded by 2 bytes.

In other words, the previous list offset indicates a position (offset) of a list along which the list should be advanced when the previous operation is carried out. When the previous list offset is equal to "$FFFF", the previous operation is prohibited.

The next list offset indicates a position of a selection list which should be continuously advanced when the next operation is carried out. When there is no list continuously to be advanced, the next list offset is set to "$FFFF".

Furthermore, the return list offset represents a position of a list which should be advanced when the return operation is performed.

For example, when it is so set that one selection is made by using a plurality of selection lists, these selection lists are effectively utilized. For example, when 12 selection branches are set and 4 selection branches are set by the 3 selection lists respectively, the respective selection lists are continued along forward/backward directions by employing the previous list offset and the next list offset, so that the user can search a desirable selection branch by performing the previous operation/next operation.

Furthermore, a default list offset is recorded. This default list offset indicates a position of a list, along which the list should be advanced when the user makes no selection, but performs the execution.

Also, a time out list offset is recorded. This time out list offset indicates a position of a list, along which the list should be advanced when the user makes no input with respect to the selection menu under reproduction and a predetermined time has passed. When the time out list offset is "$FFFF", no input is entered and a preselected time has elapsed. At this time, a specific selection branch is selected at random from the selection branch indicated in the selection menu, and the process operation is advanced to this list.

Subsequently, a wait time until time out is recorded. When the wait time recorded therein has elapsed while no input is made by the user, this is advanced to the above-described time out list offset.

Next, a loop count and a jump timing are indicated. The loop count indicates the number of reproduction for repeatedly reproducing the play item in this list. Also, the jump timing indicates a timing when the next list is advanced after performing the selection operation.

Subsequently, a play item number (PIN) s indicated. This PIN indicates a play item to be reproduced under execution condition of this selection list by a definition of FIG. 18. A thing to be reproduced in the selection list is the normal menu screen. As a consequence, as the segment play item, the video data for the menu is recorded. There are many cases that a specific segment play item in each of the selection lists is designated.

For instance, when the menu image data corresponding to this selection list is recorded as the segment play item #4, the play item number (PIN) thereof becomes "1003".

As described above, a single PIN is provided in the selection list.

Finally, to indicate the operation to be actually executed by selecting the desired selection branch, a selection #BSN offset to a selection #(BSN+NOS−1) offset are indicated by 2 bytes, respectively. It should be noted that symbol "BSN" is a first number of the selection branch recorded in the 4th byte of the selection list, and symbol "NOS" is a selection branch number recorded in the 3rd byte of the selection list. As a consequence, in the selection list having the selection branches 1 to 4, the selection #1 offset to the selection #4 offset are recorded.

Each of these selection offsets indicates a position of a list (selection list, or play list), along which the list should be advanced when this selection branch is selected.

For instance, when the user selects the selection branch 2 with respect the menu display, it is designated that the process operation is advanced to the list indicated by the selection #2 offset.

* End List

The end list represents a terminal of an application. The end list is arranged by 8 bytes, namely an end list header in 1 byte, and "$00" in 7 bytes.

C. Segment Play Item

As shown in FIG. 6C, a segment play item area is provided in a video CD data track. A start point of the segment play item area is indicated in the disc information of FIG. 14 from the 49th byte to the 51st byte in 3 bytes.

As a segment play item, 1980 pieces of segment play items may be recorded at maximum in the segment play item.

Each of these segment play items may be freely produced by the still picture data, the moving picture data, and the audio data.

A single segment is constructed of 150 sectors. The respective segment play item may be data reproduced as an independent item, or a plurality of items continuously reproduced.

With reference to FIG. 15, each of these segment play items will now be explain. In the disc information, the data attribute is indicated by the segment play item content table recorded from the 57th byte to the 2036th byte.

As previously explained, the menu screen of the section list may be prepared by using this segment play item.]

II. Playback Control (PBC)

1. List Structure

As described above, since the play list and the selection list are employed, a so-termed "playback control (PBC)" may be realized in a video CD. This playback control is a function to realize the PBC as a simple interactive type software with combination of a moving picture, a still picture and a voice in the video CD.

That is, the still picture data used to constitute several menu screens as the segment play item is prepared in the segment play item area. The segment play items can be branched to be reproduced by the selection list, and also the play item selected by the branching operation is reproduced in accordance with the play list.

In other words, a description file is formed which is made in the hierarchical form based upon the selection list and the play list. In response to the selection made by the user, the process operation is advanced to a lower hierarchical layer so as to thereby perform a predetermined reproducing operation.

As a basic list structure, the selection list is arranged at the uppermost position, and several play lists are arranged as the selection branches by this selection list. For example, specific play lists of the above-explained selection list are designated as the selection #1 offset to the selection #3 offset.

Then, the menu display is executed in the selection list so as to be selected by the user.

When the user selects, e.g., the selection #3, the process operation is advanced to the play list indicated by the selection #3 offset, and the data indicated as the play item #1 number to the play item #N number of this play list. For example, when the track #5 is designated as one play Item #1 number in the advanced play list, then the reproduction of the track 5 is executed.

2. Concrete Example

Figure 20:
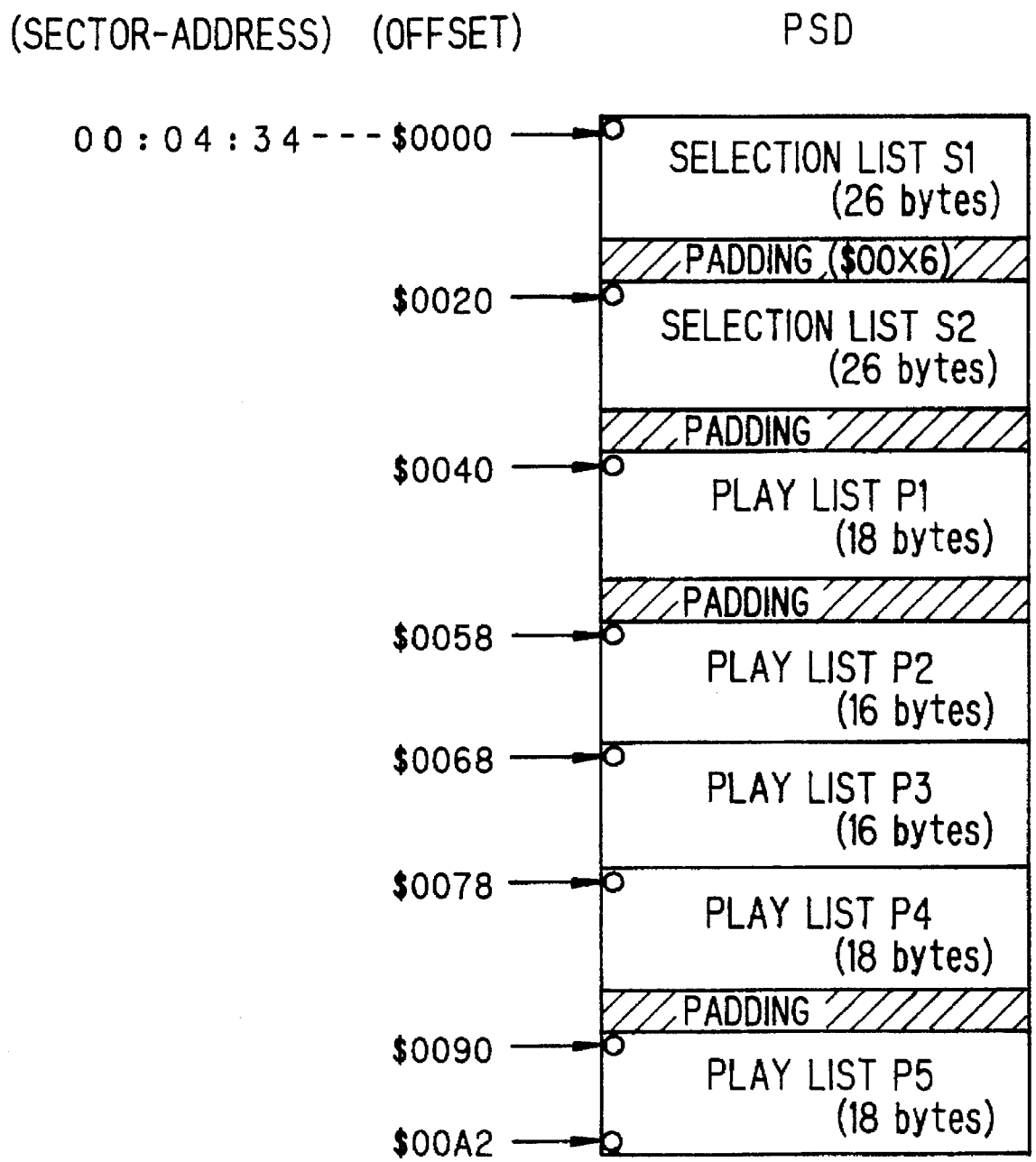
FIG. 20 is an explanatory diagram for indicating a list structure of the video CD.

Referring now to FIG. 20 and FIG. 21, a concrete example of such a playback control (PBC) operation will be explained. In this example, a video CD is manufactured as a software of an English conversation lesson.

As indicated in FIG. 20, a list is recorded as a PSD from a position of an absolute time address of 00:04:34 within the video CD information area.

In other words, selection lists S1, S2 and play lists P1 to P5 are recorded.

To the respective lists, list IDs are attached as indicated in FIG. 21. That is, the list IDs are defined by such that a list ID of $0001 is attached to the selection list S1, a list ID of $0002 is attached to the selection list S2, a list ID of $0005 is given to the play list P1, a list ID of $0006 is given to the play list P2, a list ID of $0007 is attached to the play list P3, a list ID of $0003 is attached to the play list P4, and a list ID of $0004 is attached to the play list P5.

When the process operation is entered into the playback control operation, the selection list S1 whose list ID is equal to $0001 first functions.

As the operations by the selection list S1, the reproduction is carried out by the play item number (PIN) recorded therein.

A value of "1000" is indicated in this PIN. As easily understood from FIG. 18, since this value of "1000" is equal to a numeral value indicative of the segment play item #1, the segment play item #1 recorded in the segment play item area is reproduced.

The reproduced output of this segment play item #1 becomes a still picture menu image (screen) used to select such an English lesson course as indicated as PB1.

In the selection list S1, a selection #1 offset to a selection #1 offset to a selection #3 offset, corresponding to the three selection branches, are recorded As a consequence, the three selection branches are represented by the reproduced output picture by the segment play item #1. It should be noted that symbol "Sel #N" indicates a selection #N offset.

With regard to this picture PB1, the user enters a desirable selection branch number.

Assuming now that the selection branch number 1 is inputted by the user, the process operation is advanced to a list indicated in the selection #1 offset. The selection #1 offset is "#0004", and then "$0020" is obtained by multiplying this numeral value by an offset multiplier "8". This namely is equal to the offset byte of the selection list S2 within PSD.

Then, a value of "1001" is indicated in the PIN within the selection list S2. That is, this value indicates the segment play item #2. As a result, the segment play item #2 is reproduced.

A reproduced output PB6 of this segment play item #2 becomes a still picture menu image used to select the English lesson courses 1 through 3 in the upper grade course.

To the contrary, assuming that the user inputs the selection branch number 1, the process operation is advanced to a list indicated in the selection #1 offset with the selection list S2. The selection #1 offset is equal to "$0008", and then this numeral value is multiplied by the offset multiplier "8", thereby obtaining "$0040". Namely, the process operation is advanced to the play list P1.

In this play list P1, a value of PIN #1 is "2" and the track #2 is designated. Also, a value of PIN #2 is "3" and the track #3 is designated. Also, a value of PIN #2 is "3" and the track #3 is designated. As a consequence, when the process operation is advanced to the play list P1, the track #2 is first reproduced to output a moving picture (and also voice) PB7. This is used as the moving picture and voice in the English lesson course 1 in the upper grade class.

When the reproducing operation of the track #2 is accomplished, the track #3 is subsequently reproduced to thereby output a moving picture (and voice) PB8.

On the other hand, if the user enters the selection branch number 3 at the time when the menu picture PB6 is outputted by the selection list S2, then the process operation is advanced to the list indicated in the selection #2 offset within the selection list S2, namely the play list P2.

In this play list P2, the segment play item #3 is designated with the value "1002" of the PIN #1. As a consequence, when the process operation is advanced to the play list P2, the segment play item #3 is reproduced, so that for instance, a still picture (and voice) PB9 is outputted. For instance, the English lesson course 2 in the upper grade class corresponds to such a lesson as a slide show.

If the user inputs the selection branch number 3 at the time when the menu picture PB6 is outputted by the selection list S2, then the process operation is advanced to the list indicated in the selection #3 offset within the selection list S2, namely the play list P3.

In this play list P3, a value of the PIN #1 is "8", and a track #8 is designated. It is assumed that this track #8 corresponds to such a track having only digital audio data. Then, the track #8 is reproduced as the English lesson course 3 in the upper grade class, so that the output PB10 with only the voice is made.

Next, assuming now that the user inputs the selection branch number 2 corresponding tot he middle grade class at the time when the menu picture PB1 is outputted based on the first selection list S1, the process operation is advanced to the list indicated by the selection #2 offset In the selection list S1, namely a play list P4.

In this play list P4, a track #4 is designated with PIN #1=4, and also a track #3 is designated with PIN #2=5. Accordingly, when the process operation is advanced to the play list P4, the track #4 is first reproduced to output a moving picture (and voice) PB2. Subsequently, the track #5 is reproduced to output a moving picture (and voice) PB3. This reproduce output is used as the moving picture and the voice belonging to the middle grade class.

Also, assuming that the user inputs the selection branch number 3 corresponding to the beginner's grade class at the time when the menu picture PB1 is outputted based on the first selection list S1, the process operation is advanced to the list indicated by the selection #3 offset in the selection list S1, namely a play list P5.

In this play list P5, a track #6 is designated with PIN #1=6, and also a track #7 is designated with PIN #2=7. Accordingly, when the process operation is advanced to the play list P5, the track #6 is first reproduced to output the reproduced moving picture (and voice) PB4. Subsequently, the track #7 is reproduced to output the reproduced moving picture and (voice) PB5.

This output is used as the moving picture and voice for the beginner's grade class.

As previously explained, it should be understood that the previous list offset, the next list offset, and the return list offset may be recorded in the play lists and also the selection lists. Also, the default list offset and the time out list offset may be additionally recorded in the selection list. As a consequence, the advance/backward operations of the list may be performed in response to the operations.

When, for instance, "$0004" is recorded as the previous list offset of the play list P1, If the user carries out the previous operation during the operation of the play list P1, then the process operation is returned to the selection list P2 where the As previously explained, the video CD may be made in the simple interactive type software form by way of the playback control. With such a function, the video CD may be widely applied not only to music and movie, but also educational purposes, game purposes, and electronic book publishing purposes.

III. ARRANGEMENT OF REPRODUCING APPARATUS

1. Outer Appearance

A description will now be made of a reproducing apparatus capable of reproducing the above-described video CD, according to an embodiment of the present invention.

The reproducing apparatus according to the embodiment may store therein 5 sheets of video CDs and CD-DAs, which may be selectively reproduced, namely is a so-called "disc exchangeable video CD player".

Figure 22:
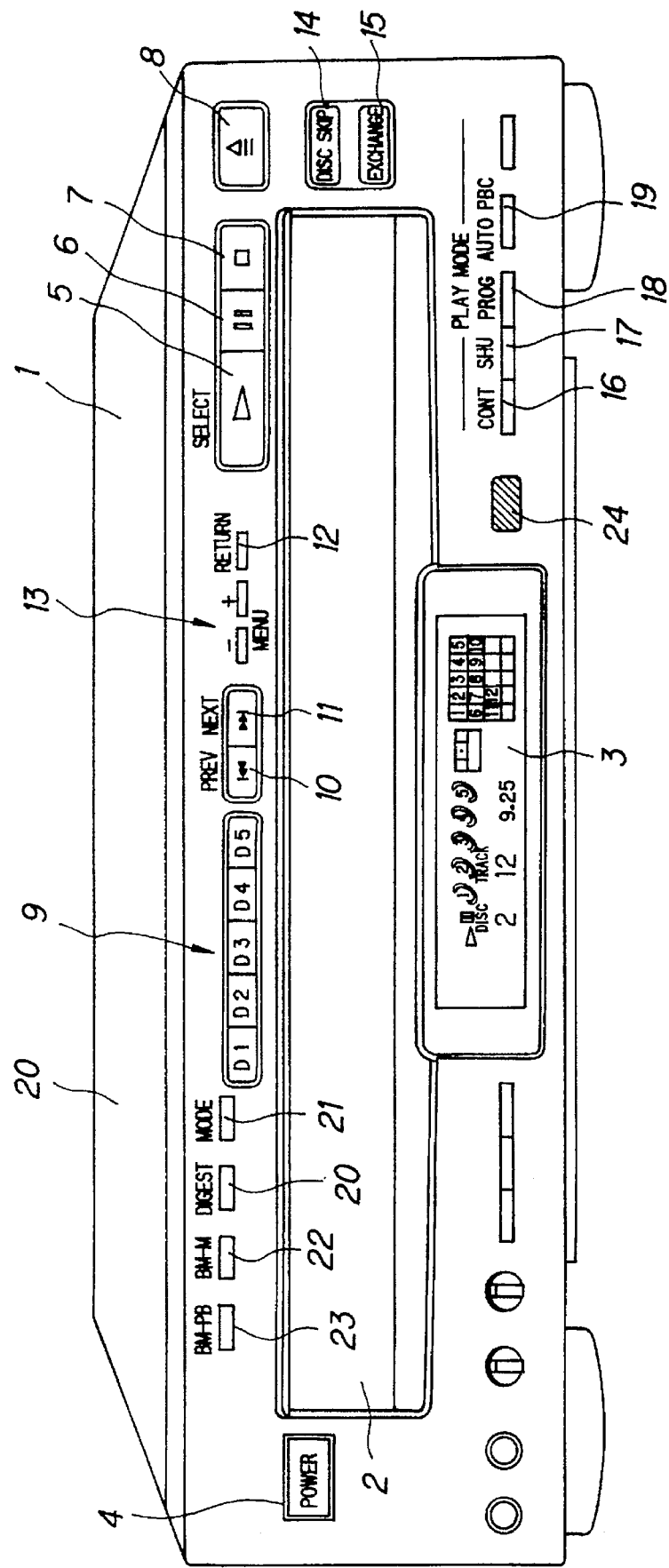
FIG. 22 is an outer view for showing a reproducing apparatus according to the present invention.

An outer appearance of this reproducing apparatus is indicated in FIG. 22.

Reference numeral 1 indicates a main body of a reproducing apparatus.

Figure 23:
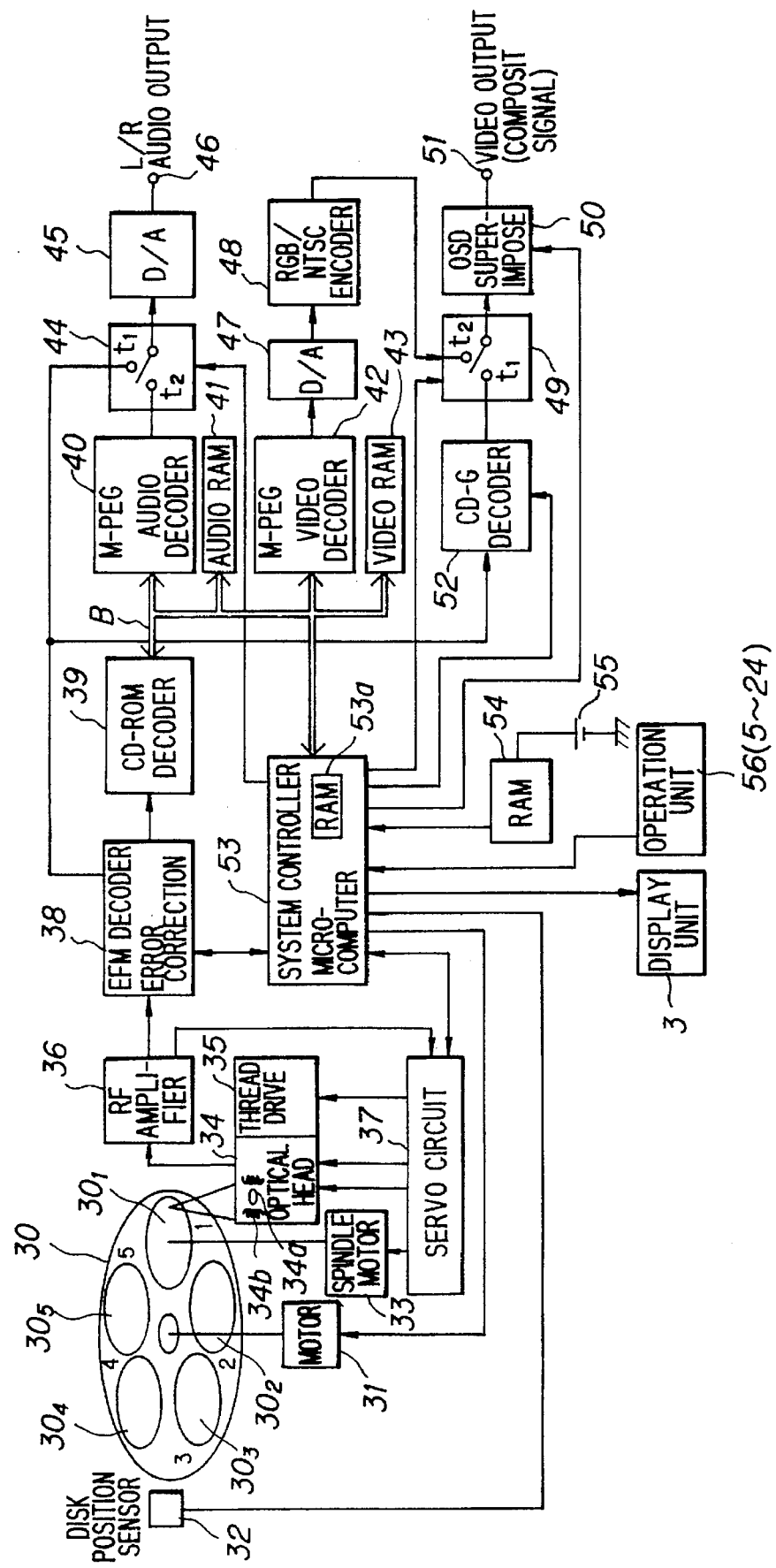
FIG. 23 is a schematic block diagram of the reproducing apparatus according to the present invention.

Reference numeral 2 denotes a disc loading unit provided on a front panel of the reproducing apparatus 1, from which a disc tray 30 shown in FIG. 23 is drawn to a front surface side. Five sheets of discs may be loaded on this disc tracy 30 in such a manner that these discs are arranged along the surface direction thereof. The discs are rotated in a roulette form, so that the disc to be reproduced is selected.

Reference numeral 3 represents a display unit constructed of a liquid crystal display (LCD) panel. The LCD display panel 3 displays the operation conditions, modes, number of selected disc, and operation time of the reproducing apparatus.

Various sots of keys operated by a user are provided on this front panel. Reference numeral 4 indicates a power source ON/OFF key.

Reference numeral 5 denotes a reproducing key. This reproducing key 5 also has a function of a selection key (selection enter key) used to perform the above-explained playback control operation.

Reference numeral 6 indicates a pause key, reference numeral 7 represents a stop key, and reference numeral 8 shows an eject key.

Reference numeral 9 is a disc selection key. Five sets of disc selection keys "D1" to "D5" are prepared. These five disc selection keys correspond to five discs stored on the disc tray. For example, when the disc selection key "D1" is depressed, the disc stored at the first storage position on the disc tracy is loaded to a position of an optical head provided inside the reproducing apparatus so as to be reproduced.

Reference numerals 10 and 11 are keys for AMS (Auto Music Scan) operations. That is, reference numeral 10 indicates an AMS key to seek a head portion having a smaller program number, whereas reference numeral 11 denotes an AMS key to seek a head portion having a larger program number. Also, the backward head seeking key 10 owns a previous key used to perform the previous operation during the above-explained playback control operation. Further, the forward head seeking key 11 owns a next key used to perform the next operation during the above-described playback control operation.

Reference numeral 12 shows a return key used to perform a return operation during the playback control operation.

Reference numeral 13 denotes a ± selection key used to perform a selection operation on a menu screen during the playback control operation. In other words, the menu selection may be accomplished by selecting a desirable selection branch number by operating the ± selection key 13 from the menu screen, and by selectively operating the reproducing key 5 at the time when this desirable selection branch number is designated.

Reference numeral 14 is a disc skip key, and reference numeral 15 shows a disc change key.

Reference numerals 16 to 19 show selection keys for play modes, in which reference numeral 16 is a normal reproducing mode key. When such a disc additionally equipped with the playback control function is reproduced, if the normal reproducing mode key 16 is depressed, then the reproducing apparatus is automatically entered into the playback control operation.

Reference numeral 17 denotes a shuffle mode key, and reference numeral 18 indicates a program reproducing mode key.

Reference numeral 19 is a PBC off key by which the PBC mode is turned OFF. When the PBC off key 19 is depressed while the disc having the playback control function is loaded, the reproducing apparatus is brought into the normal continuous reproducing operation from the menu reproducing operation by the PBC mode.

Reference numeral 20 indicates a digest key, and reference numeral 21 shows a digest mode key. A digest image (picture) about each of the stored discs may be displayed by operating the digest key 20. By operating the digest mode key 21, the digest image about the disc additionally equipped with the playback control function may be selectively used as the menu image, or the image in the track.

Reference numeral 22 is a bookmark register key, and reference numeral 23 shows a bookmark reproducing key. During the reproducing operation, the user depresses the bookmark register key 22 to register this reproducing point. Thereafter, the user depresses the bookmark reproducing key 23 to reproduce from this point. For example, five reproducing points may be designated to be registered on a single disc by depressing the bookmark register key 22. After the bookmark reproducing key 23 is depressed, when a selection is made of one of these registered bookmark points, the reproducing operation is commenced from this reproducing point. The registered bookmark point is selected by employing, for example, the ± selection key 13 and the selection key 5.

Reference numeral 24 denotes an infrared signal receiving unit. When an infrared command signal is transmitted from a remote commander (not shown), this infrared command signal is received by this infrared signal receiving unit 24 to be converted into an electric signal which will then be acquired as operation information by an internal system controller.

2. Circuit Block

FIG. 23 represents an internal circuit arrangement of the reproducing apparatus.

In FIG. 23, reference numeral 30 is a disc tray. Storage positions 301 to 305 are provided on the disc tray 30, by which five discs can be mounted. Then, the disc tray 30 is so constructed as to be rotated by a motor 31. A certain storage position 30x is transferred to a position of the optical head 34 by this tray rotation. That is to say, the disc mounted on this storage position 30x is loaded to the position of the optical head 34. Reference numeral 32 shows a disc position sensor. Based upon the position of this disc position sensor 32, the system controller 53 can grasp the present loading condition, namely which storage position 30x is located at the position of the optical head 34.

The loaded disc is chucked so as to be rotated by a spindle motor 33. Then, while this loaded disc is rotated by the spindle motor 33, the laser light is illuminated from the optical head 34, and the reflection laser light from this disc is used to read out various information.

On the optical head 34, a laser diode functioning as a laser output means, an optical system constructed of a deflection beam splitter and an objective lens, and a detector for detecting the reflection light are mounted. The objective lens 34a is held by a two-shaft mechanism 34b in such a manner that this objective lens 34a is displacable along the disc radial direction and the direction apart from the disc. Reference numeral 35 indicates a thread mechanism for driving the optical head 34 along the disc radial direction.

The information detected from the disc by the optical head during the reproducing operation is supplied to an RF amplifier 36. The RF amplifier 36 performs the calculation process of the supplied information to thereby extract a reproduction RF signal, a tracking error signal, a focusing error signal, and the like. Then, the extracted reproduction RF signal is supplied to a decoder unit 38 in which the EFM demodulation (Eight Fourteen Demodulation) and the error correction are performed. Also, P and Q channel subcode data are derived to be supplied to the system controller 53.

The tracking error signal and the focusing error signal are supplied to a servo circuit 37. The servo circuit 37 produces various servo drive signals based upon a tracking jump instruction, and an access instruction derived from the tracking error signal and the focusing error signal, and also the rotation speed detection information of the spindle motor 33. Also, the servo circuit 37 controls the two-shaft mechanism 34b and the thread mechanism 35 to perform the focusing/tracking control operations, and also controls the spindle motor 33 in the CLV (constant linear velocity) mode.

Reference numeral 39 indicates a CD-ROM decoder. In the case that a disc under reproduction is a video disc, namely a so-called "CD-ROM formatted disc", the decode process is carried out by the CD-ROM decoder 39 in accordance with the CD-ROM format.

Among the signals decoded by the CD-ROM 39, the above-described various disc information such as the information about the playback control is acquired into the RAM 53a of the system controller 53.

Also, the audio data decoded by the CD-ROM decoder 39 is supplied to an MPEG audio decoder 40. The MPEG audio decoder 40 performs the decoding operation at a preselected timing by using an audio RAM 41, and outputs a decoded audio signal.

Furthermore, the video data decoded by the CD-ROM 39 is furnished to an MPEG video decoder 4i. The MPEG video decoder 42 performs the decoding operation at a predetermined timing with using a video RAM 43 and outputs a decoded video signal (RGB outputs).

Reference numeral 44 is a switch unit switched in response to the sort of disc to be reproduced.

When the disc under reproduction corresponds to a CD-DA, the signal reproduced from this CD-DA is processed by the decoder unit 38 by way of the EFM demodulation and the CIRC (Cross Interleave Read-Solomon Coding) process, thereby producing a digital audio signal.

While the CD-DA is reproduced, the system controller 53 causes the switch unit 44 to be connected to a terminal "t1". Accordingly, the digital audio signal derived from the decoder unit 38 is converted into an analog audio signal by a D/A converter 45, and this analog audio signal is outputted to such an external appliance as an amplifier circuit or an amplifier provided outside an audio output terminal 46.

When the disc under reproduction is an audio CD, the audio data is obtained from the MPEG audio decoder 40. During the reproduction of the audio CD, the system controller 53 causes the switch unit 44 to be connected to a terminal t2. As a result, the digital audio signal derived from the MPEG audio decoder 40 is converted by a D/A converter 45 into an analog audio signal, and this analog audio signal is outputted to such an external appliance as an amplifier circuit and an amplifier provided outside the audio output terminal 46.

When a video CD is reproduced, RGB video (picture) data is obtained as the outputs from the MPEG video decoder 42. This RGB video data is converted by a D/A converter 47 into an RGB analog signal. Then, the RGB analog signal is supplied to an RGB/NTSC encoder 48 so as to be converted into a composite video signal of the NTSC system. The composite NTSC video signal is supplied to a terminal t2 of the switch unit 49.

During the reproduction operation of the video CD, the system controller 35 causes the switch unit 49 to be connected to the terminal t2, so that the composite video signal of the NTSC system is supplied via an OSD (On-Screen Display) process unit 50 from a video output terminal 51 to a monitor apparatus and the like so as to output video information. In response to an instruction issued from the system controller 53, the OSD process unit 50 operates to display a preselected superimpose image.

On the other hand, when the disc to be reproduced is a CD-DA and also is a CD-G, the still picture data are read out from the R to W channels of the subcodes. The still picture data is supplied to a CD-G decoder 52 and then this still picture data is outputted as a composite picture signal (still picture) of the NTSC system. During the reproduction of the CD-DA, the switch unit 49 is connected to the terminal t1, so that the picture signal reproduced from the CD-G is supplied via the OSD process unit 50 from the video output terminal 51 to the monitor apparatus and the like so as to output the video information. Also in this case, the OSD process unit 50 performs the predetermined superimpose image display.

Reference numeral 54 shows a RAM used to back up the data of memories by way of a back-up power source 55. In this RAM 54, the data for registering the bookmark point, i.e., such data which should not be lost when the power supply is turned OFF is stored. As apparently, an E-EPROM may be employed.

Reference numeral 56 indicates an operation input unit for user operations, and corresponds to the various operation keys (5 to 23) and the infrared signal receiving unit 24 (and remote controller) shown in FIG. 22. When the disc is reproduced, the management information recorded on this disc, namely TOC and subcode data are read out, and are supplied to the system controller 53. The system controller 53 causes the display unit 3 to display the reproducing time and the like in accordance with the management information.

Figure 24:
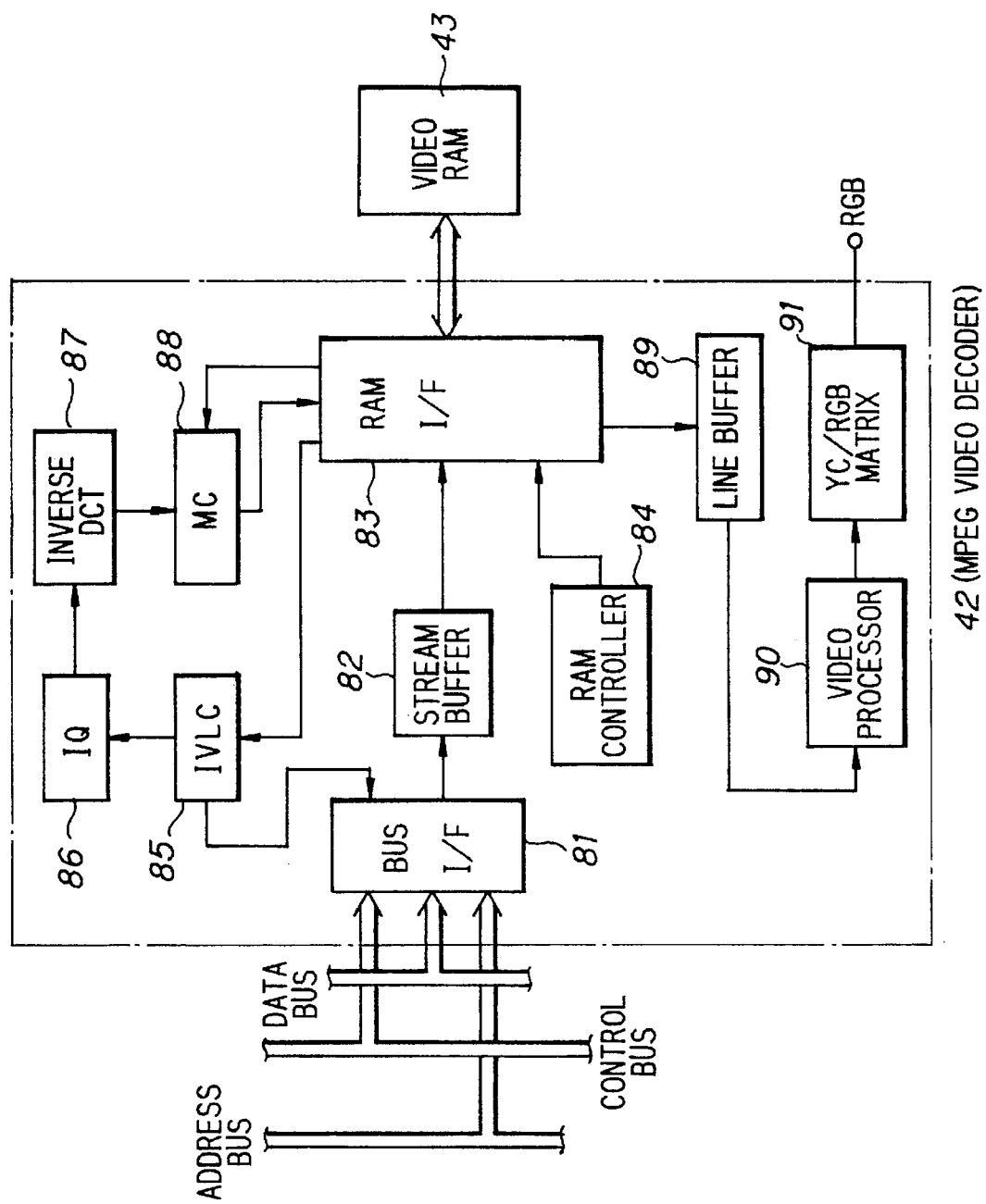
FIG. 24 is a schematic block diagram of an MPEG video decoder according to the present invention.

FIG. 24 schematically represents an Internal arrangement of the MPEG video decoder 42. As represented in FIG. 23, the CD-ROM decoder 39, the MPEG audio decoder 40, the MPEG video decoder 42, and the system controller 53 are connected via a bus B to each other. As this bus B, there are a data bus, a control bus, and an address bus as represented in FIG. 24. In the MPEG video decoder 42, the data input/output operations to these buses B are performed by a bus interface unit 81.

The video data outputted from the CD-ROM decoder 39, namely the MPEG video stream data corresponding to the compressed data read from the disc is fetched from a bus interface unit 81 to a stream buffer 82.

The video data fetched by the stream buffer 82 is written via a RAM interface unit 83 to a preselected region of a video RAM 43.

Reference numeral 84 shows a RAM controller for controlling an access operation to the video RAM 53, and the RAM controller 84 produces a read/write control signal and an address signal.

Reference numeral 85 indicates a variable length coding code processing unit corresponding to a unit for decoding the variable-length-coded data by the MPEG standard. In this variable length coding code processing unit 85, either the start code, or the end code contained in the bit stream is detected, and the various sorts of parameters are derived.

The compressed data which has been written from the stream buffer 82 into the video RAM 43 and thereafter read out from the video RAM 43 is processed in the variable length coding code processing unit 85 to derive the header information of the respective layers. Also, the tables corresponding to the respective variable length codes are selected to be decoded. Furthermore, the run length code of the video data is decoded to reconstruct a block of a cosine (COS) coefficient.

Moreover, in the variable length coding code processing unit 85, a variable length coding code indicative an image data length of a single screen (1 macro block) is drawn from the compressed data stream. Then, the drawn variable length coding code is compared with an actual length of a single screen data stream, namely a data length defined from the start code to the end code. If there is no coincidence, then a variable length coding code error signal is produced.

When the data is correctly read out from the disc, the variable length coding code should be coincident with the data length defined from the start code to the encode. However, when a portion of data has been dropped out due to outer disturbance occurred while the data is read from the disc, the variable length coding code is not made coincident with the actual data length, namely the data length defined from the start code to the end code.

As a consequence, such a case that the variable length coding code error signal is produced implies such a case that the data dropout happens to occur. This variable length coding code error signal is supplied from the bus interface unit 81 via the control bus to the system controller 53.

Reference numeral 86 indicates a dequantizing unit. The dequantizing unit 86 dequantizes the COS coefficient, and performs the multiplication and the convolution process of the quantized coefficient in accordance with the MPEG standard.

The output from the dequantizing unit 86 is supplied to an inverse DCT converting unit 87. Since it is conceived that the output from the dequantizing unit 86 corresponds to the two-dimensional frequency, the inverse DCT converting unit 87 performs an inverse COS converting calculation so as to return this output from the dequantizing unit 86 to the original image data.

Reference numeral 88 is a movement compensation processing unit. In the MPEG unit, the movement compensation frame prediction is employed which is equal to the compression technique using correlation between the successive frames. To the contrary, in this movement compensation processing unit 88, the data is read out from the video RAM 43 by using the movement vector contained in the bit stream, and then is calculated with the block data decoded from the dequantizing unit 86, thereby to reconstruct the image block.

The video data constituting one screen image reconstructed by the decoding process is written into the video RAM 43.

The decoded video data are read from the video RAM 43 to be written into a line buffer 89, and are further processed in an image processing unit 90 based on various image processes such as interpolation/interleave processes. Then, the resultant data are converted into RGB signals by a matrix circuit 91.

[IV. Operation performed When Still Picture Data is Reproduced]

A description will now be made of process operations by the above-described reproducing apparatus when still picture data is reproduced.

As the still image reproducing operations, there are mainly the menu (image) screens shown in the PB1 and PB6 of FIG. 21, which is designated by the selection list in the playback control, and the still image shown in the PB9, designated by the play list. In other words, the still image data as the segment play item recorded in the segment play item is reproduced.

As described above, there is such data containing only a moving picture and voice as the segment play item. As to the attribute of the respective segment play item, a judgement can be made based on the information about the segment play item content table, as explained in FIG. 15.

Figure 25:
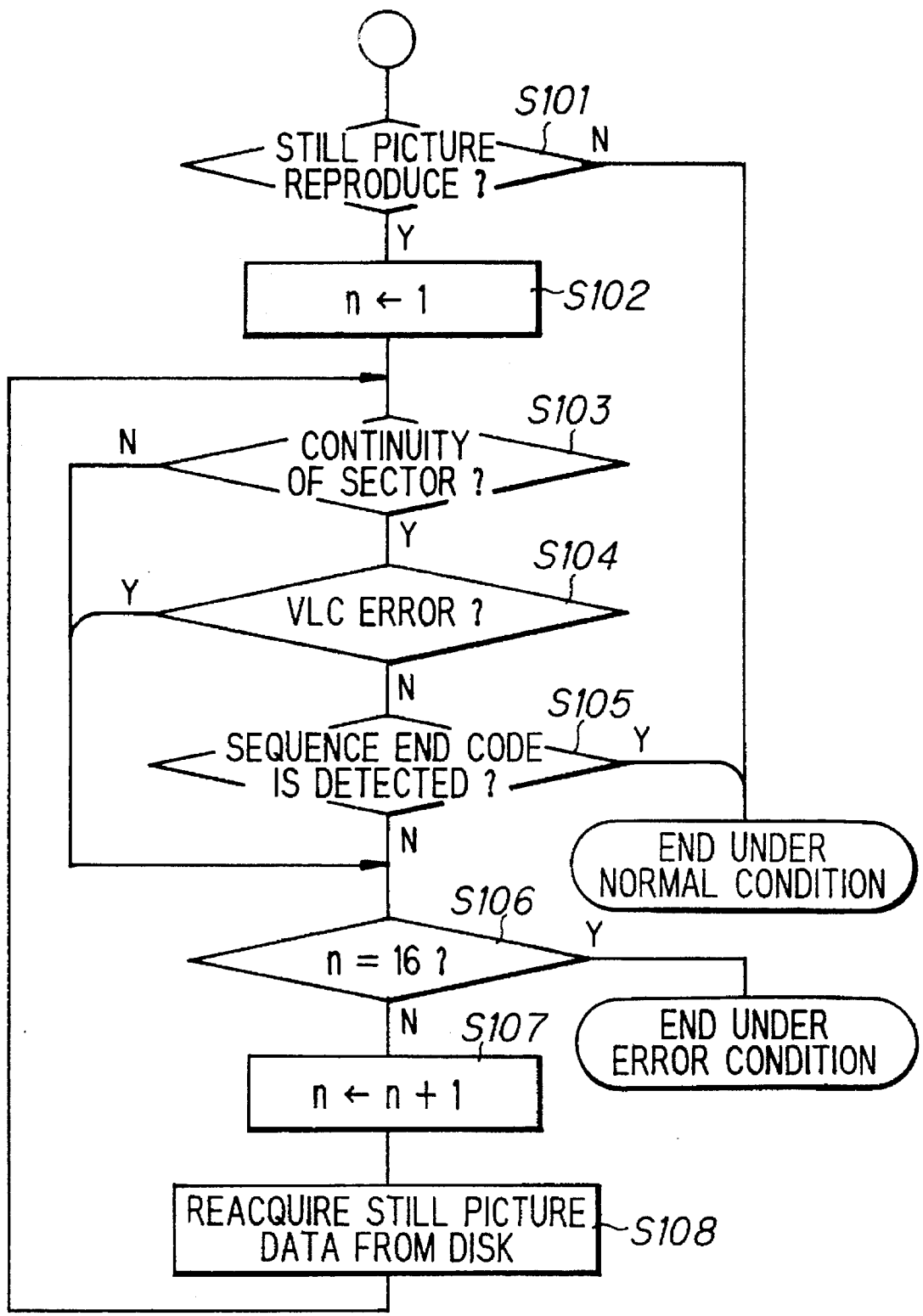
FIG. 25 is a flow chart for indicating a process operation performed when a still picture is reproduced, according to the present invention.

When the segment play item is reproduced, the system controller 53 executes a process operation indicated in FIG. 25.

In the case that a certain segment play item is reproduced by the playback control or other operations, the system controller 53 judges the attribute of the segment play item to be reproduced from the segment play item content table, and stores this judgement information into the RAM 53a.

Then, at the time when this segment play item data reading operation is accomplished, the system controller 53 judges whether this read data corresponds to the still picture data, or the moving picture data based upon the information stored in the RAM 53a (S101). When this read data is the moving picture data, the process operation is ended under normal condition.

To the contrary, when the read data corresponds to the still picture data, the process operation is advanced to a step S102 at which a variable "n" is set to 1.

Next, a check is done as to whether or not the sector address decoded by the CD-ROM decoder 39 while this segment play item data is read out is correctly continued (S103). When the continuity of the sector address is not maintained, it may be such a case that the data portion in sector unit is dropped out from the read data. In this data to dropout case, since the segment play item data is not correctly carried out, the process operation is not accomplished under normal condition, but is advanced to a step S106.

Conversely, when the continuity of the sector address is maintained, a confirmation is made as to whether or not the variable length coding code error signal is produced (S104). As previously explained, such a case when the variable length coding code is not coincident with the actually read data length, i.e., the data length defined from the start code to the end code corresponds to a case when a data portion has dropped out. Then, the variable length coding code error signal is supplied from the variable length coding code processing unit 85 is supplied to the system controller 53. When this variable length coding code error signal is issued, since the segment play item data cannot be correctly performed, the process operation is not accomplished under normal condition, but is advanced to a step S106.

When no variable length coding code error signal is issued, a judgement is done as to whether or not the end code can be correctly detected (S105). If the end code is correctly detected, then the process operation is accomplished under normal condition. Conversely, when the end code could not be correctly detected, since the screen display may not be correctly performed, the process operation is not accomplished under normal condition, but is advanced to a step S106.

Such a case that the process operation is not accomplished under normal condition, but is advanced to the step S106, corresponds to a case when the screen display could not be correctly performed in the monitor apparatus due to the dropout of read data. Therefore, a confirmation is made as to whether or not the variable "n" is equal to 16. When the variable "n" is not equal to 16, this variable "n" is incremented (S107).

Then, at a step 108, the segment play item for constituting this still image data is again accessed to the optical head 34, and the data is again read from the disc.

Then, when the data reading operation is complete, the judgements defined at the steps S103, S104 and S105 are carried out. When no data dropout occurs, the process operation is accomplished under normal condition. In other words, when the still image data without any dropout can be obtained by again performing the data reading operation, so that the normal screen display is made on the monitor apparatus.

When a data portion again happens to occur, the process operations defined after the step S106 are repeated.

It should be noted that when n=16, namely the data reading errors are continuously produced 16 times, the process operation is accomplished as an erroneous operation.

In the case that a disc has a scratch noise, for instance, data cannot be properly read. In such a case, if there is no limitation in the data reading time, then the process operation is repeatedly performed for ever. It should be noted that the reading time restriction is not limited to 16.

As previously described, the data dropout may be judged by monitoring the variable length coding code error signal and also the continuity of the sector address. When the data dropout happens to occur, the data reading operation is immediately performed. Therefore, it can be avoided that the unproper still picture is displayed on the monitor.

For example, such a condition can be avoided that no menu screen portion indicative of the selection branch is displayed and thus, the user cannot perform the selection operation on the selection branch.

What is claimed:

1. A reproducing apparatus for reproducing a recording medium on which both of still picture data having at least variable data length, and data length information corresponding to the still picture data have been recorded, comprising:

reading means for reading out both said still picture data and said data length information corresponding to the still picture data from the recording medium;

decoding means for decoding the still picture data and also the data length information corresponding to said still picture data, which are read out by said reading means;

measuring means for measuring a data length of said still picture data decoded by said decoding means;

comparing means for comparing the data length information decoded by the decoding means with the data length measured by said measuring means; and controlling means for making such a judgement that the still picture data is dropped out by way of said comparing means when the data length information decoded by the decoding means is not coincident with the data length of the still picture data measured by the measuring means, and for controlling said reading means to again read out the same still picture data.

2. A reproducing apparatus as claimed in claim 1, further comprising address data judging means for judging a continuity of an address of said decoded still picture data, wherein:

when said address data judging means judges that the address is discontinuous, said controlling means controls said reading means to again read the same still picture data.

3. A reproducing apparatus as claimed in claim 1, further comprising:

end data judging means for judging as to whether or not an end code of said decoded still picture data can be detected, wherein:

when said end data judging means cannot detect the end code of the decoded still picture data, said controlling means controls said reading means to again read the same still picture data.

4. A reproducing apparatus as claimed in claim 2, further comprising:

end data judging means for judging as to whether or not an end code of said decoded still picture data can be detected, wherein:

when said end data judging means cannot detect the end code of the decoded still picture data, said controlling means controls said reading means to again read the same still picture data.

5. A reproducing apparatus for reproducing a recording medium on which both of still picture data having at least variable data length, and data length information corresponding to the still picture data have been recorded, comprising:

a reader for reading out both said still picture data and said data length information corresponding to the still picture data from the recording medium;

a decoder for decoding the still picture data and also the data length information corresponding to said still picture data, which are read out by said reader;

a counter for counting a data length of said still picture data decoded by said decoder;

a comparator for comparing the data length information decoded by the decoder with the data length counted by said counter; and a controller for making such a judgement that the still picture data is dropped out by way of said comparator when the data length information decoded by the decoder is not coincident with the data length of the still picture data counted by the counter, and for controlling said reader to again read out the same still picture data.

6. A reproducing apparatus as claimed in claim 5, further comprising:

an address data judger for judging a continuity of an address of the still picture data decoded by said decoder, wherein:

when said address data judger judges that the address is discontinuous, said controller controls said reader to again read the same still picture data.

7. A reproducing apparatus as claimed in claim 5, further comprising:

an end data discriminator for judging as to whether or not an end code of said decoded still picture data can be detected; wherein:

when said end data discriminator cannot detect the end code of the decoded still picture data, said controller controls said reader to again read the same still picture data.

8. A reproducing apparatus as claimed in claim 6, further comprising:

an end data discriminator for judging as to whether or not an end code of said decoded still picture data can be detected; wherein:

when said end data discriminator cannot detect the end code of the decoded still picture data, said controller controls said reader to again read the same still picture data.

9. A method for reproducing still image data from a recording medium on which both still picture data having at least variable data length, and data length information corresponding to the still picture data have been recorded, comprising:

a step for reading out both said still picture data and said data length information corresponding to the still picture data from the recording medium;

a step for decoding the still picture data and also the data length information corresponding to said still picture data, which are read out by said reading step;

a step for measuring a data length of said still picture data decoded by said decoding step;

a step for comparing the decoded data length information with the measured data length; and a step for making such a judgment that the still picture data is dropped out by way of said comparing step when the decoded data length information is not coincident with the measure data length of the still picture data, and for again reading out the same still picture data.

10. A reproducing method as claimed in claim 9, further comprising:

a step for judging as to a continuity of an address of the decoded still picture data; wherein:

when said judging step judges that the address is discontinuous, a control is made to again read the same still picture data.

11. A reproducing method as claimed in claim 9, further comprising:

a step for judging as to whether or not an end code of the decoded still picture data can be detected; wherein:

when the end code of said decoded still picture data cannot be detected at said step, a control is made to again read the same still picture data.

12. A reproducing method as claimed in claim 10, further comprising:

a step for judging as to whether or not an end code of the decoded still picture data can be detected; wherein:

when the end code of said decoded still picture data cannot be detected, a control is made to again read the same still picture data.

13. A decode circuit comprising:

controlling means for controlling read/write operations of still picture data from/into storage means, which still picture data has been reproduced from a recording medium on which the still picture data having at least variable data length and data length information corresponding to the still picture data have been recorded;

picture data length calculating means for calculating a picture data length corresponding to one screen based upon a starting address and an end address by detecting header information from said reproduced still picture data;

separating means for separating picture information and data length information from said reproduced still picture data;

comparing means for comparing the data length information separated by said separating means with the picture data length calculated by said calculating means; and generating means for generating a variable length data error signal when said comparing means judges that the data length information separated by the separating means is not coincident with the picture data length calculated by said calculating means.

* * * * *